US011233628B2

(12) United States Patent
Figueira

(10) Patent No.: US 11,233,628 B2
(45) Date of Patent: Jan. 25, 2022

(54) EQUIVOCATION AUGMENTATION DYNAMIC SECRECY SYSTEM

(71) Applicant: Helder Silvestre Paiva Figueira, London (GB)

(72) Inventor: Helder Silvestre Paiva Figueira, London (GB)

(73) Assignee: Helder Silvestre Paiva Figueira, London (GB)

( * ) Notice: Subject to any disclaimer, the term of this patent is extended or adjusted under 35 U.S.C. 154(b) by 204 days.

(21) Appl. No.: 16/472,423

(22) PCT Filed: Dec. 27, 2016

(86) PCT No.: PCT/EP2016/025195
§ 371 (c)(1),
(2) Date: Jun. 21, 2019

(87) PCT Pub. No.: WO2018/121834
PCT Pub. Date: Jul. 5, 2018

(65) Prior Publication Data
US 2019/0363877 A1    Nov. 28, 2019

(51) Int. Cl.
*H04L 9/06* (2006.01)
*H04L 9/08* (2006.01)
(Continued)

(52) U.S. Cl.
CPC .......... *H04L 9/0662* (2013.01); *H04L 9/0668* (2013.01); *H04L 9/0861* (2013.01);
(Continued)

(58) Field of Classification Search
CPC ............... H04L 9/06–0668; H04L 9/08; H04L 9/0861–0869; H04L 9/14; H04L 9/16
See application file for complete search history.

(56) References Cited

U.S. PATENT DOCUMENTS

| 5,412,730 A | 5/1995 | Jones |
| 6,351,539 B1 | 2/2002 | Djakovic |

(Continued)

FOREIGN PATENT DOCUMENTS

WO    WO 2012140144    10/2012

OTHER PUBLICATIONS

International Search Report and Written Opinion in corresponding PCT Application No. PCT/EP2016/025195, dated Sep. 18, 2017.
(Continued)

*Primary Examiner* — Daniel B Potratz
*Assistant Examiner* — D'Arcy Winston Straub
(74) *Attorney, Agent, or Firm* — Andrus Intellectual Property Law, LLP

(57) ABSTRACT

Shannon's equivocation, the conditional entropy of key or message with respect to a specific ciphertext, is the primary indicator of the security of any secrecy system, in that when key equivocation H E (K) or message equivocation H E (M) attain log 0 (or 1) under a brute-force attack, the system is compromised and has no security. We propose a simplistic equivocation definition of security which distinguishes between "secure/unsolvable" and "insecure/solvable" encipherments. Whilst equivocation may be used practically in a passive manner to cryptanalyse finite-length key "insecure/solvable" secrecy systems to determine the length of ciphertext required to compromise the secrecy system, the invention in this patent offers a cryptographic design framework which allows for the equivocation of finite-length key systems to be actively engineered using equivocation augmentation, such that the residual key and message equivocation of any cryptosystem may be continuously augmented at a faster rate than it is lost, effectively ensuring that equivocation can never attain log 0. In short, it allows for the encryption of any length of message with any finite length key into a ciphertext with "secure/unsolvable" security characteristics. Alternatively, it allows for the cryptographic engineering of information theoretic security in all finite (Continued)

length key systems. The invention is primarily aimed at solving two major problems: (a) a viable practical security solution against future quantum computing/artificial intelligence threats (the QC/AI problem), and (b) a viable practical security solution to the privacy/national interest dichotomy problem, in that it allows for the engineering of security systems which are capable of simultaneously supporting both the absolute privacy of individual users and the security interests of the user group at large. Various methods, apparatuses, and systems are described which allow for the implementation of a "secure/unsolvable" secrecy system which is fast, extensible, simple to implement in hardware and software, and able to be incorporated by or with any existing security solution or cryptographic primitives.

7 Claims, 7 Drawing Sheets

(51) Int. Cl.
*H04L 9/14* (2006.01)
*H04L 9/16* (2006.01)

(52) U.S. Cl.
CPC .............. *H04L 9/0869* (2013.01); *H04L 9/14* (2013.01); *H04L 9/16* (2013.01)

(56) References Cited

U.S. PATENT DOCUMENTS

| | | | |
|---|---|---|---|
| 9,614,668 B1* | 4/2017 | Simmons | H04L 9/0852 |
| 9,635,011 B1* | 4/2017 | Wu | H04L 63/083 |
| 2013/0136255 A1* | 5/2013 | Brown | H04L 9/001 380/28 |
| 2016/0149696 A1 | 5/2016 | Winslow et al. | |
| 2017/0353302 A1* | 12/2017 | Fernandez | G06F 21/6254 |

OTHER PUBLICATIONS

International Search Report and Written Opinion in corresponding PCT Application No. PCT/EP2016/025195, dated Mar. 22, 2019.

* cited by examiner

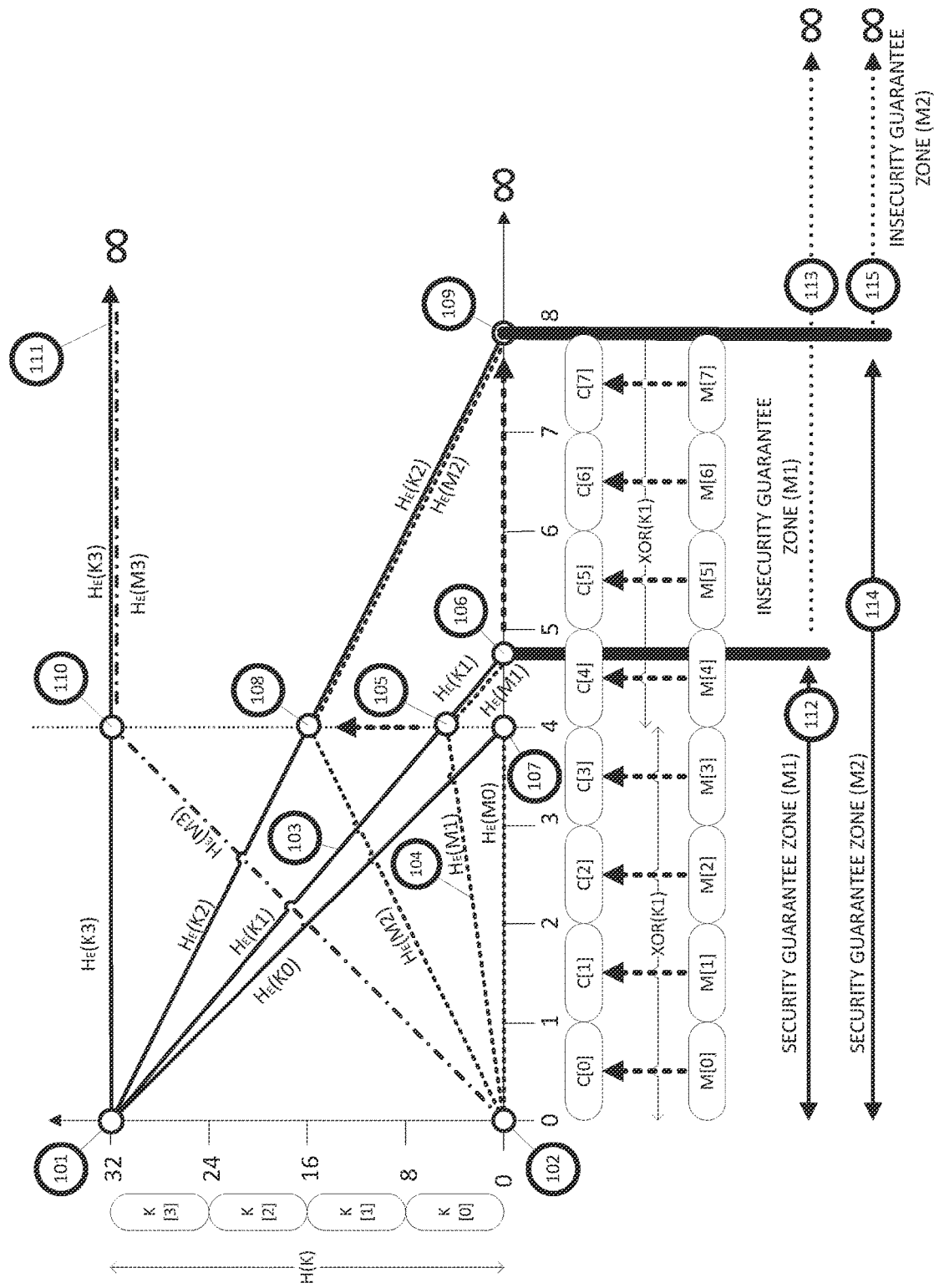

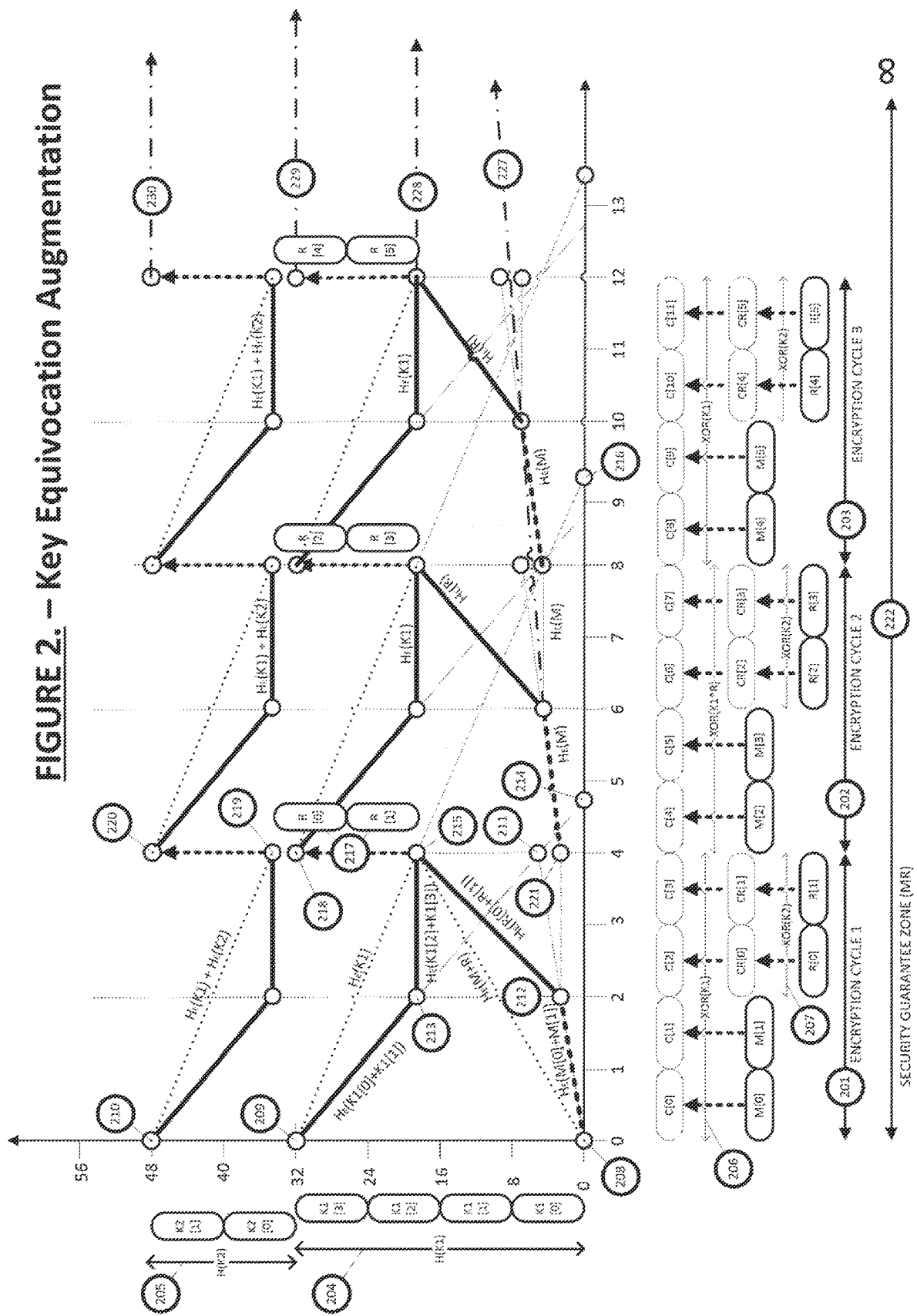
FIGURE 2. – Key Equivocation Augmentation

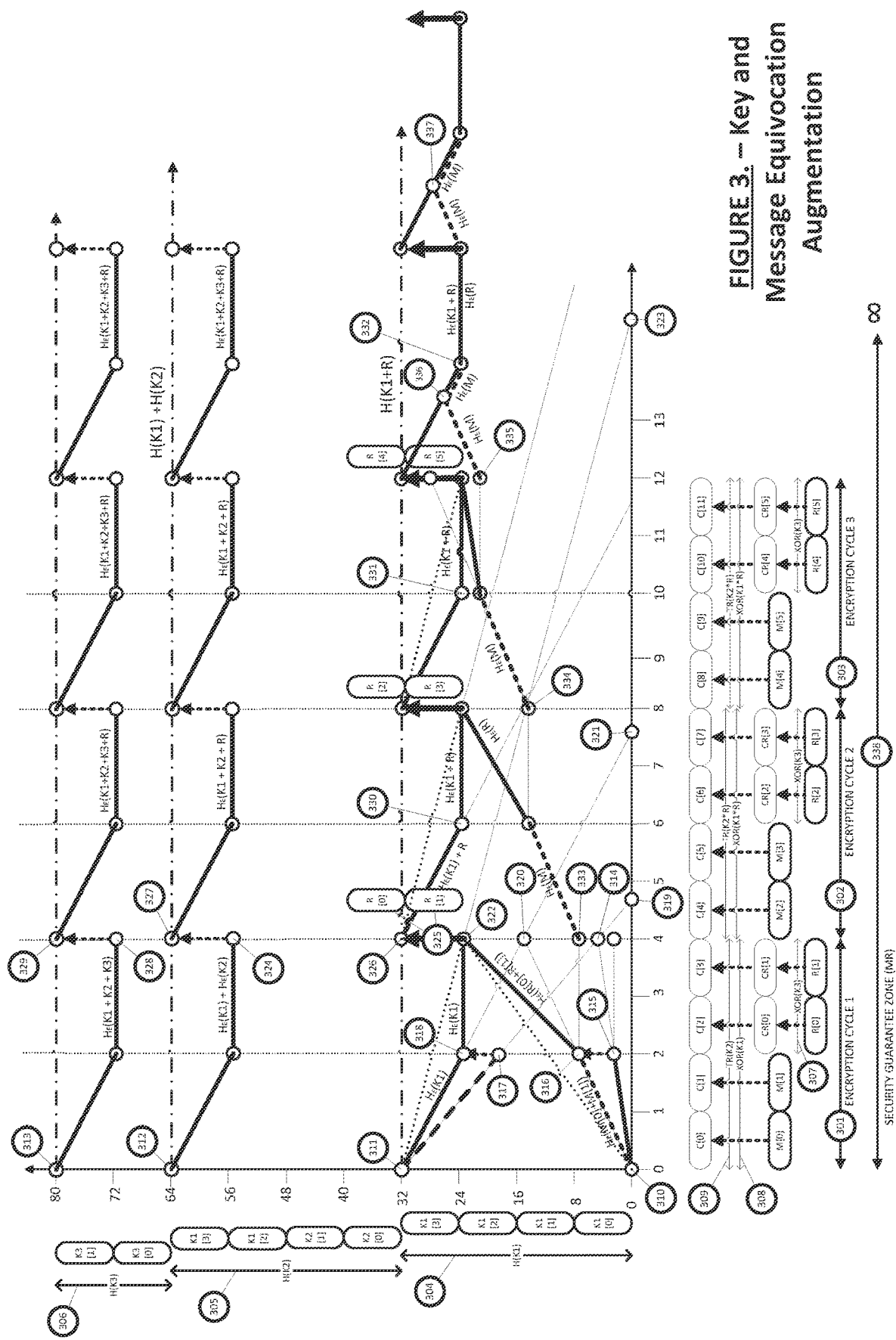
FIGURE 3. – Key and Message Equivocation Augmentation

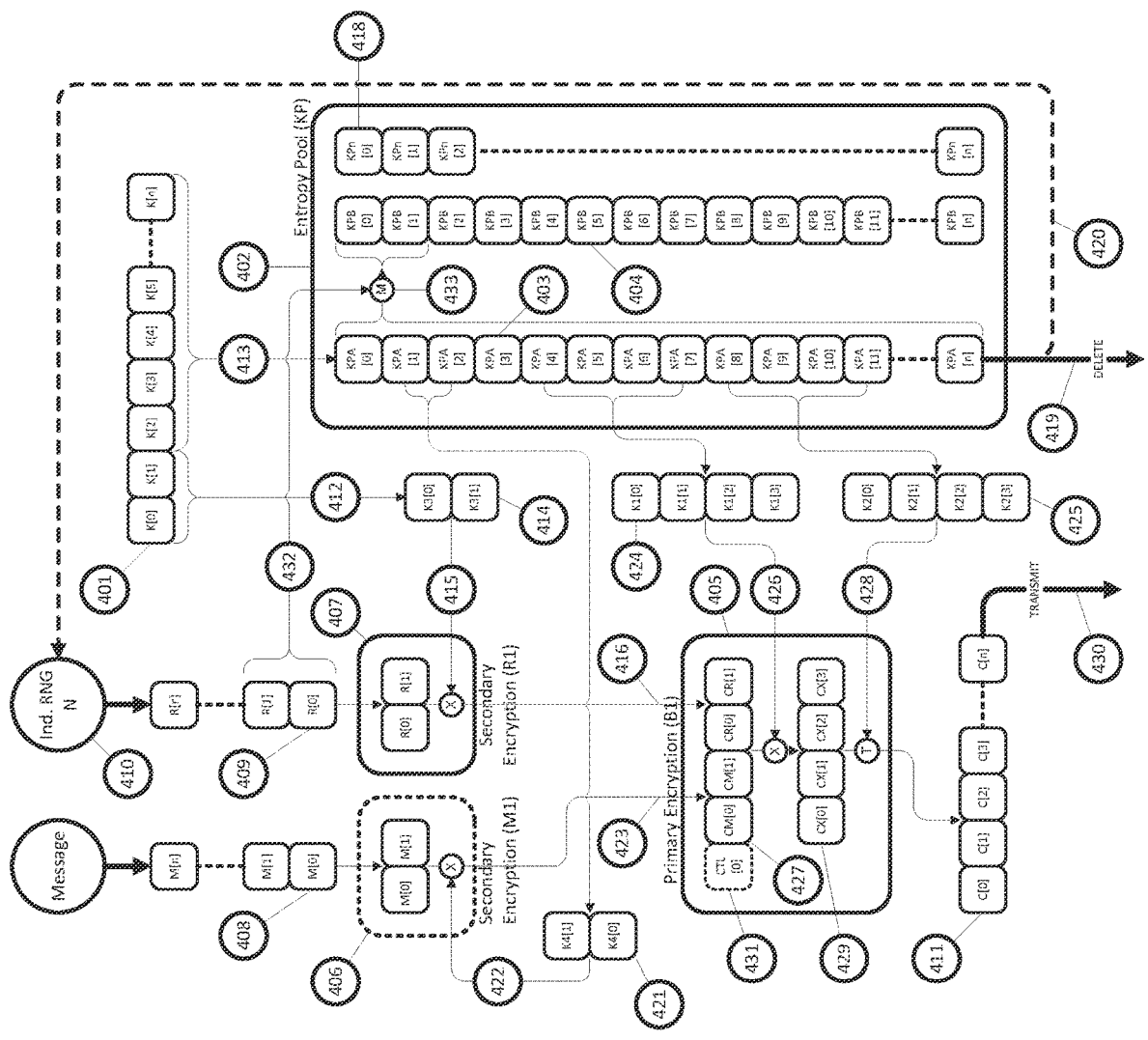
FIGURE 4. – Equivocation Augmentation Secrecy System

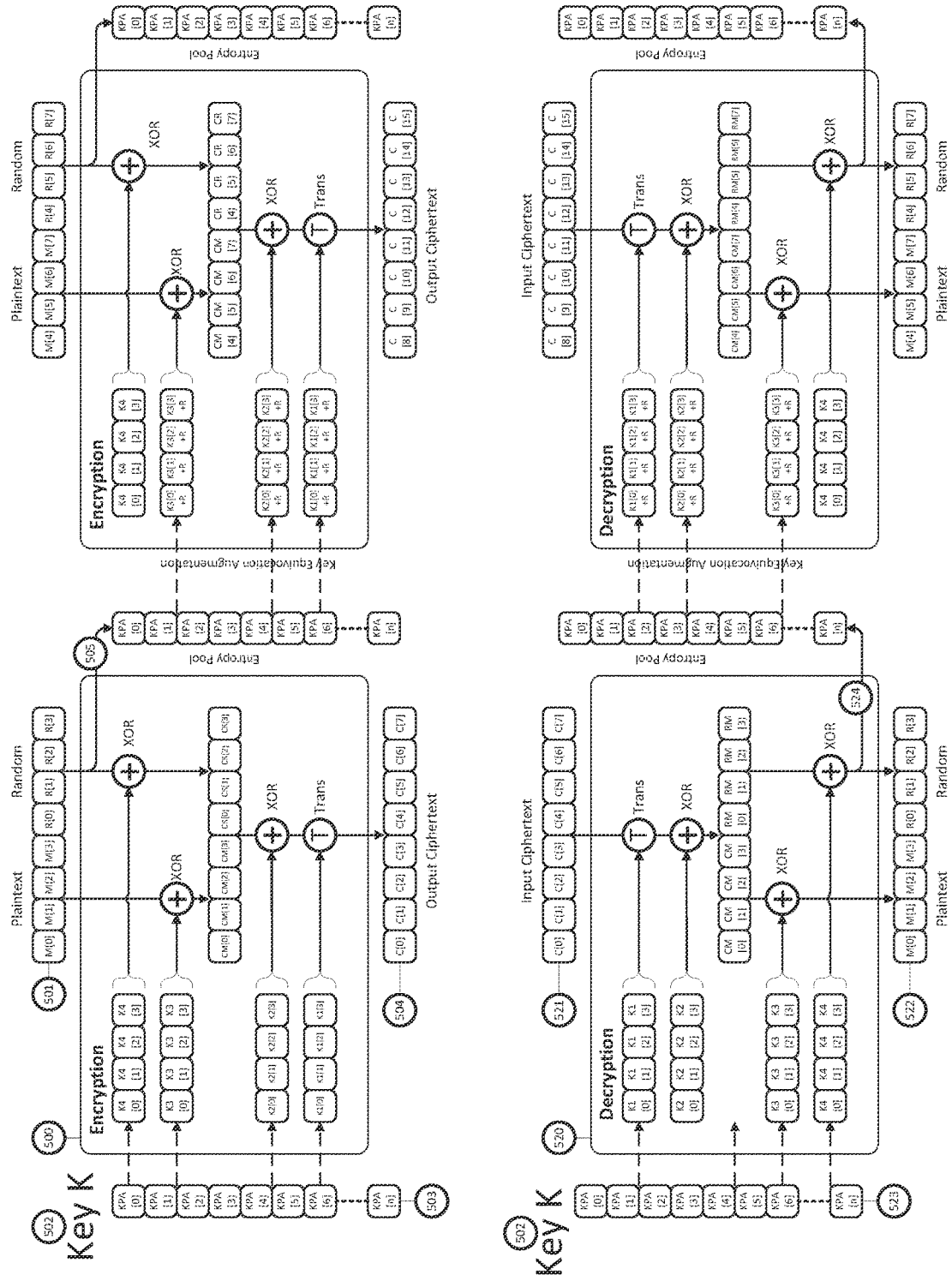
FIGURE 5. – Equivocation Augmentation Block Cipher Implementation

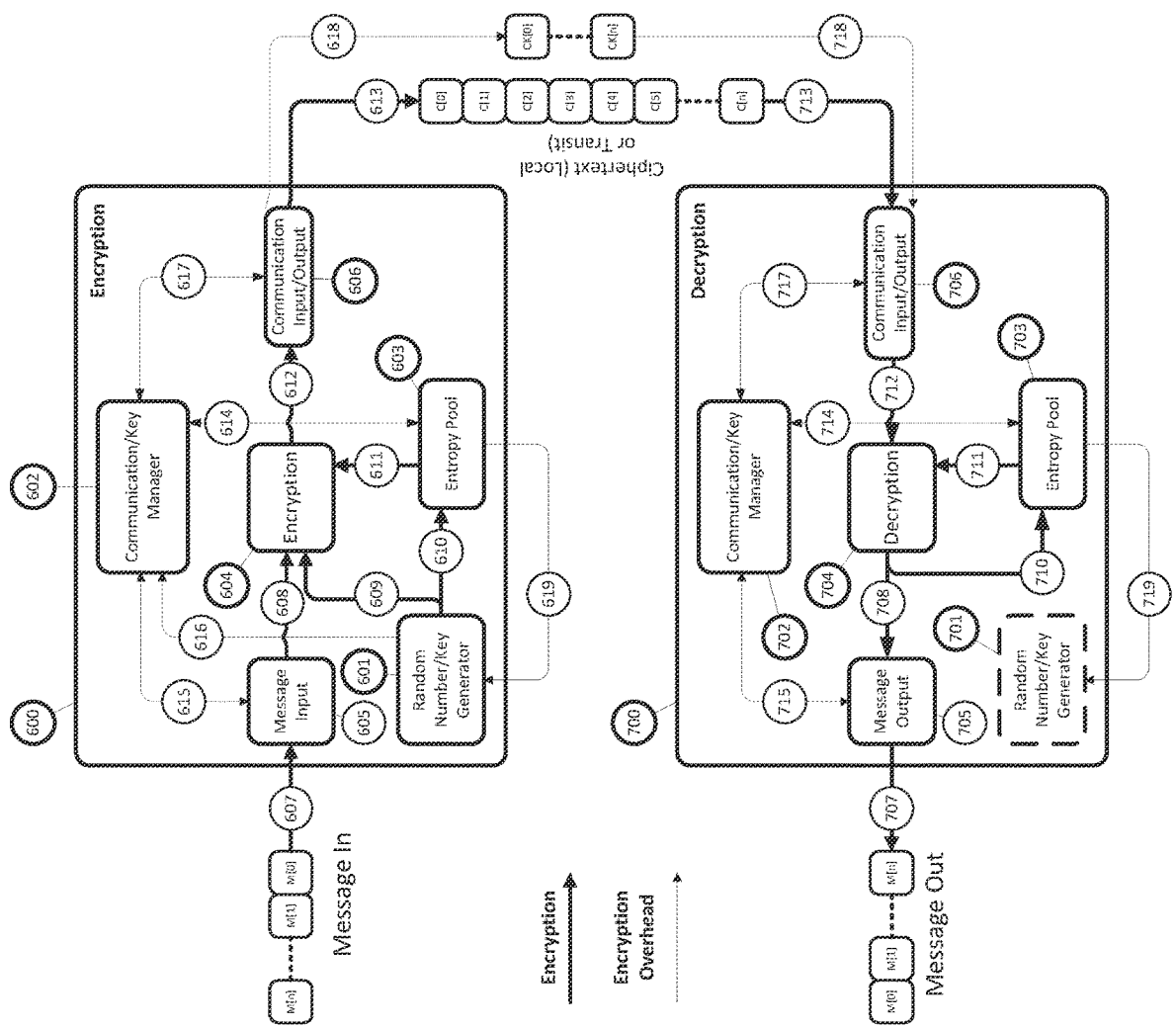
FIGURE 6. – Equivocation Augmentation Apparatus Implementation

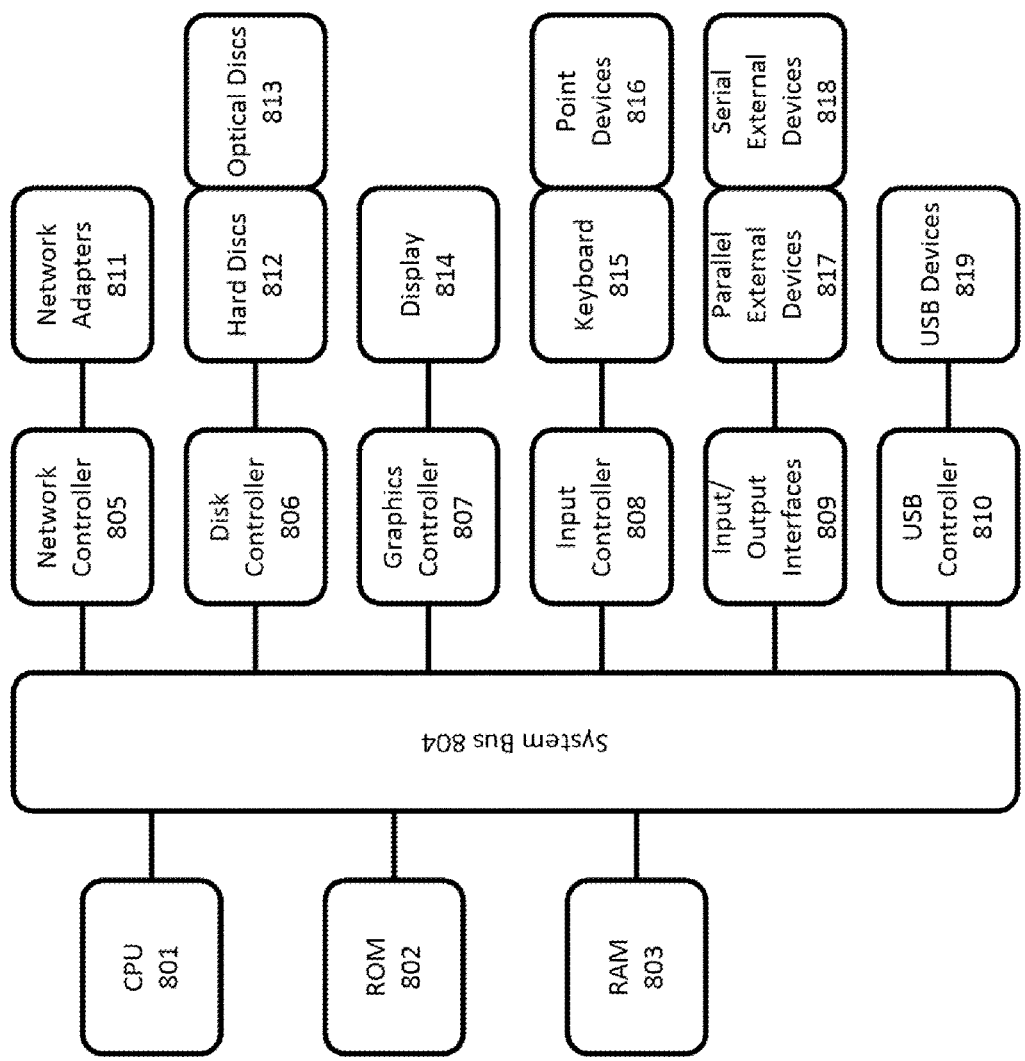
FIGURE 7: Equivocation Augmentation - Computer Device Implementation

EQUIVOCATION AUGMENTATION DYNAMIC SECRECY SYSTEM

CROSS-REFERENCE TO RELATED APPLICATIONS

This application is the U.S. national stage application of International Application PCT/EP2016/025195, filed Dec. 27, 2016, which international application was published on Jul. 5, 2018, as International Publication WO2018/121834 in the English language. The international application is incorporated herein by reference, in entirety.

CROSS REFERENCE TO RELATED APPLICATIONS

U.S. Pat. No. 1,310,719—Gilbert Vernam—"Secret Signaling System"

U.S. Pat. No. 5,412,730—Michael F. Jones—"Encrypted Data Transmission System Employing Means for Randomly Altering the Encryption Key"

U.S. Pat. No. 7,376,232, —Hamdy Soliman—"Computer System Security Via Dynamic Encryption"

DESCRIPTION

Background of the Invention

This invention relates to the fields of cryptography, secure data transmission and secure storage systems which entail the use of enciphered data. This invention relates particularly to the field of information theoretic cryptographic engineering and scientific method whereby the equivocation security characteristic found in all cryptographic secrecy systems may be actively engineered to ensure that such systems are information-theoretically secure, and that such systems may be verified to be information-theoretically secure by experiment.

Data encryption entails the securing of data or information, by transforming the data into encrypted ciphertext using a key and a transformation algorithm, function, or cipher. In symmetric systems data decryption entails the reversal of the encryption process, using an identical key and transformation, converting the ciphertext back to the data. The transformation function and the length of key selected effectively denote the cryptographic problem to be solved by an assailant which intercepts the ciphertext.

In cryptography, the concept of equivocation (or conditional entropy) was first defined by Claude Shannon in his 1949 paper "Communication Theory of Secrecy Systems", as the primary basis for determining what it means to be "secure", by distinguishing between "unsolvable" and "solvable" encipherments or cryptographic problems. Shannon regarded equivocation as a secrecy index of keys and messages with respect to a specific ciphertext. In layman's terms, equivocation is the residual keys (key equivocation) and residual messages (message equivocation) after a comprehensive cryptanalysis by a determined assailant on an intercepted length of ciphertext. For a mathematical treatment of equivocation it is advised that readers acquaint themselves with Shannon's paper on secrecy systems, for it forms the foundation of the invention.

A security problem with almost all finite-length key cryptosystems (or specifically the encipherments of these systems), is that given a length of intercepted ciphertext, an assailant with knowledge of the encryption mechanics and length of key is able to try all possible keys and identify all valid key/message decipherments. The common security concept of "hiding a needle in a haystack" is not a security feature, it's a flaw. If the ciphertext is sufficiently long, the key trial process will result in a single viable and probable key/message pair—the solution to the problem. Shannon's equivocation allows for a graphical evaluation and analysis of the above problem with regard to any secrecy system, and also allows for the formulation of a solution, the underlying basis of the invention.

From an information theory perspective, message redundancy may be defined as follows—given a language and a length of message characters, all possible combinations of alphabet characters will result in two sets of message types, those which are valid (information), and those which are not (redundancy). The message entropy, or amount of information produced when a message is chosen can be measured by $H(M)=-\Sigma P(M) \log P(M)$, where $P(M)$ is the probability P of the message M over all possible messages. Similarly, the key entropy, or amount of information produced when a key is chosen can be measured by $H(K)=-\Sigma P(K) \log P(K)$, where $P(K)$ is the probability P of the key K over all possible keys. Experiments have shown that normal English sentences over 30 characters in length contain in general 1.3 bits of information and 6.7 bits of redundancy when transmitted using 8-bit ASCII. On this basis, normal English messages ordinarily have 16% information and 84% redundancy.

Shannon defined the equivocation (conditional entropy) of key $H_E(K)$ and message $H_E(M)$ with regards to ciphertext E, respectively as:

$$H_E(K)=-\Sigma_{E,K} P(E,K) \log P_E(K), \text{ and,}$$

$$H_E(M)=-\Sigma_{E,M} P(E,M) \log P_E(K),$$

where $P(E,K)$ is the probability of key K and cryptogram E, and $P_E(K)$ is the a posteriori probability of key K if cryptogram E is intercepted, and $P(E,M)$ and $P_E(M)$ are the similar probabilities for the message M. Equivocation is therefore a logarithmic representation of the residual messages and keys after cryptanalysis.

Shannon demonstrated that equivocation had a number of interesting properties, proving, and we quote, (a) "the equivocation of key $H_E(K,N)$ is a non-increasing function of N . . . " (N being the ciphertext length captured), (b) "the equivocation in message $H_E(M)$ of a product system S=TR is not less than that when only R is used", (c) "the equivocation H of a weighted sum of systems is bounded . . . " and (d) the equivocation of a weighted sum of languages is also bounded, and interestingly, that (e) for a pure cipher the equivocation of key $H_E(K)$ could be calculated by $H_E(K)=H(K)+H(M)-H(E)$, where $H_E(K)$ is the equivocation of key K, $H(K)$ is the entropy of key K, $H(M)$ is the entropy of the message M and $H(E)$ is the entropy of the ciphertext E.

From the above proofs, Shannon concluded that in the case of a random cipher (defined as an ensemble of ciphers) the equivocation is the average equivocation for the entire ensemble, and that the problem of identifying the length of ciphertext (the "unicity distance") required to produce a unique solution under a brute force key attack could be solved using $U=H(K)/D$ where U is the length of ciphertext, $H(K)$ is the entropy of the key K used, and D is the redundancy of the language in the message. Importantly, cryptanalysts use the "unicity distance" to predetermine the viability of a brute-force attack on an encipherment, since encipherments shorter than the "unicity distance" are in general "unsolvable" and will not produce a unique decipherment.

As an example of a basic equivocation graph, in FIG. 1, we denote the equivocation graphs for an XOR encryption cipher using a 32-bit key K, with regards to 4 separate 8-bit character message types: (1) M0—a known plaintext with 0% information and 100% redundancy, (2) M1—a normal message in English having 1.3 bits of information (16%) and 6.7 bits (84%) redundancy, (3) M2—a message with 50% redundancy and 50% information, and (4) M3—a random message with 0% redundancy and 100% information. Note that each message M is associated with a key K, such that K1 is associated with M1, K2 with M2 etc. The graph plots the $H_E(K)$ key equivocation and $H_E(M)$ message equivocation of all the message types against the y-axis (which is a logarithm value) and the x-axis which represents the number of ciphertext characters (and is a linear value). At start point 101 we note that entropy of key $H(K)=H_E(K)=32$, the equivocation of key, with a value of 32. At point 102 we see that the message equivocation of all 4 messages is zero, such that $H_E(M0)=H_E(M1)=H_E(M2)=H_E(M3)=0$. With specific regard to message M1, the slope of the equivocation of key $H_E(K1)$, denoted by 103, decreases as the slope of $H_E(M1)$, denoted by 104, increases such that at 105, the "perfect secrecy" point, $H_E(K1)=H_E(M1)=4*1.3=5.2$ in value. At point 105, there are therefore $2^{4*1.3}=2^{5.2}=36.75$ possible viable M1 messages and K1 keys. In reality, $H_E(M1)$ would normally be larger than 5.2 after 4 English messages, but we will assume for simplicity (and to our detriment) that 5.2 would be correct. In context, under brute force attack, an English message M1 using a 32-bit key K1 with a total of $2^{32}=4294$ million keys, will ordinarily be reduced to 36.75 (say 37) valid keys and associated M1 messages given a ciphertext {C1, C2, C3, C4} of 4 characters. If the ciphertext was only 4 characters long, at 105, the encypherment is said to be "perfectly secret" since after a brute-force of all keys, all possible messages will present themselves as viable decryptions. However, where the ciphertext C for M1 is longer than the key K1, we see that from point 105 to the "unicity point" at 106, $H_E(M1)$ remains equal to $H_E(K1)$, and both continue down along the $H_E(K1)$ trajectory such that both hit unity ($\log_2 1=0$) at 38.09 bits, or 4.76 ciphertext characters. Note that $H(K)/D=32/0.84=38.09$ bits. Thus, from a mathematical and scientific perspective (since these results can be validated by experiment) for any M1 ciphertext longer than 4.76 characters, the ciphertext for M1 has an inherent "insecurity guarantee", and falls within an Insecurity Guarantee Zone 113. Ciphertexts shorter than the "unicity point" will in the greatest of probability produce multiple viable messages upon brute-force cryptanalysis, therefore they will have an inherent "security guarantee", and fall within the M1 Security Guarantee Zone 112. Taking M0 (the known plaintext message) into consideration, point 107 denotes the point at which the slope of the equivocation of key $H_E(K0)$ with respect to the M0 "known plaintext" message will hit unity (one viable key). Note that in such a case the equivocation of message $H_E(M0)$ remains at $\log_2 1=0$, since it is known. Point 108 is the "perfect secrecy" point with regards to M2 which has 50% redundancy and 50% information, and is the point where $H_E(K2)=H_E(M2)=4*4=16$. Thus at "perfect secrecy" point 108, there will be a total of $2^{16}=65536$ possible viable M2 messages and K2 keys after a brute-force attack on the first 4 ciphertext characters. Thus, an increase in information, or reduction in redundancy increases the value of $H_E(M)$ and $H_E(K)$ at the "perfect secrecy" point, and therefore extends the "unicity point" with regards to M2 outwards proportionately to point 109, where $32/0.5=64$ bits, or 8 characters. Thus, the "security guarantee" zone for message M2 shown by 114 extends by another 4 ciphertext characters, such that a message M2 encipherment longer than 8 characters will fall into the "insecurity guarantee zone" for M2 shown by 115 and have an "insecurity guarantee". Point 110 denotes the "perfect secrecy" point when a random string message M3 (with 0% redundancy and 100% information) is encrypted with K3 and where $H_E(K3)=H_E(M3)=32$. In such a case, there is no reduction in $H_E(K3)$ from the initial $H(K)$ entropy value of the key, all messages M3 are viable and probable, and both $H_E(K3)$ and $H_E(M3)$ trends towards infinity at point 111, irrespective of the length of the ciphertext. Note that $H_E(K3)$ never increases above $H(K)$, the initial entropy of the key K at point 101. Thus, there will only ever be $2^{32}$ possible message variations, irrespective of the length of the message, and this can be verified practically.

The one-time pad uses an infinite length key K as long as the message M to provide an infinite "security guarantee". It is important to note that the security or insecurity of any finite-length secrecy system is ultimately dependent on whether the various encipherments under that secrecy system have a "security guarantee" or "insecurity guarantee". For a finite-length secrecy system to be considered secure, it must have a "security guarantee" under all possible encipherments.

It is a primary objective of this invention to propose a secrecy system design framework which is brute force resistant under all encipherments, despite the use of a finite-length key. Considering the future threat of a Quantum Computing/Artificial Intelligence (QC/AI) assailant, we must therefore assume that any "solvable" secrecy system can be solved instantly. We therefore propose the equivocation definition of security, in that: (1) an encipherment can only be considered to be "secure/unsolvable" if and only if under all possible decryptions, $H_E(K)$ or $H_E(M)$ can never equal $\log_2 1=0$, and (2) a secrecy system can only be considered "secure/unsolvable" if and only if under all possible decryptions of all possible encipherments under that system, $H_E(K)$ and $H_E(M)$ can never equal $\log_2 1=0$. Encipherments with equivocation equal to $\log 21=0$ are therefore defined as "insecure/solvable", (in Shannon's words—practical secrecy systems), but may have a relative measure of "safety" due to a high workload, but only if it can be proven that no possible means exists which allows for a rapid solution to the cryptographic problem (almost impossible to prove—too many possible variations). Note that a high workload characteristic does not increase the "secure/unsolvable" characteristic, but may increase the "safety".

As a practical application of the "unicity distance" calculation, a symmetric encryption system such as AES-256 with a 256-bit key, used to encrypt an English message with 84% redundancy, will have a "unicity distance" of $256/0.84=304.76$ bits (38.09 characters). This is the point where $H_E(K)$ and $H_E(M)$ equal $\log_2 1=0$, and where and AES-256 encipherment becomes "insecure/solvable". This simple cryptanalytic use of equivocation evaluation can be applied to all cryptographic primitives in principle. Indeed, "unicity distance" is a base quantity for comparing the "security" or "insecurity" of any two cryptosystems, including asymmetric encryption systems, pseudo random number generators (PRNGs) and other cryptographic primitives. With PRNGs, it is the equivocation of the initial entropy pool or seed key which is evaluated. As is evident from the equivocation graph in FIG. 1 above, it is generally impossible to create a "secure/unsolvable" secrecy system for all encipherments unless the $H_E(K)$ key equivocation "depletion" problem is solved.

The primary objective of this invention, is to define a framework for the design and construction of finite-length key secrecy systems which have an infinite length "unicity distance", irrespective of the length of the message, by using a cryptographic engineering technique called "equivocation augmentation" (EQAU) which is aimed at periodically increasing the $H_E(K)$ and $H_E(M)$ of the cryptosystem at a faster rate than it is lost during the encryption process.

In accordance with a principal feature of the present invention, EQAU is used to periodically increase or augment the residual key equivocation $H_E(K)$ after every encryption cycle, such that all keys are again possible in the next encryption cycle, effectively resetting $H_E(K)$ to the $H(K)$ value. The underlying principle being that if the $H_E(K)$ of a cryptosystem can be increased or reset back to its original $H(K)$ value, or above, at a faster rate than $H_E(K)$ is lost during encryption, then $H_E(K)$ and $H_E(M)$ can never attain or be equal to loge 1=0, guaranteeing the "secure/unsolvable" security characteristics of the cryptosystem. The perpetual extension of the "unicity distance" therefore results in the "security guarantee" zone extending to infinity, under all encipherments—a "secure/unsolvable" cryptosystem. Upon an increase in $H_E(K)$, $H_E(M)$ will also be increased until they next meet, when $H_E(M)$ will follow $H_E(K)$ in its downward trend. Note that EQAU benefits accrue with both encryption of data in transit and data at rest.

In accordance with another principal feature of the invention, an independent source of entropy such as a PRNG is required for EQAU to be possible, since the entropy of a cryptosystem is ordinarily limited to $H(K)$, and can only be augmented independently. The only way to increase $H_E(K)$, is to restore $H(K)$ after each encryption cycle and before the start of the next encryption cycle.

In accordance with yet another principal feature of the invention, a second independent cryptosystem may be advantageously used (is actually required to maintain a "security guarantee") to securely transmit random entropy between communicating parties, allowing them to apply EQAU to their current keys in a synchronised manner. The application of EQAU to $H_E(K)$ entails the application of a deterministic mathematical operation on the existing K key values, using the new entropy values, such that all possible key values $H(K)$ may result. The greater the amount of random entropy, the greater the probability of $H(K)$ being attained.

In yet another principal feature of the invention, an entropy pool (an array, table, cyclic queue, PRNG or other means of holding and operating on random values) of entropy greater than $H(K)$ may be advantageously used in a preferred embodiment for EQAU purposes, such that EQAU is applied to the entropy pool, and the new K keys are derived from the values of the entropy pool after EQAU has been applied. This feature naturally allows for the concept of an "information-theoretically" secure PRNG in that EQAU may be applied to the $H(K)$ of a deterministic PRNG, altering its output in a probabilistic stochastic manner. Preferred embodiments therefore include PRNGs of such a design.

In yet another principal feature of the invention, EQAU may be advantageously applied during the encryption cycle to augment message equivocation $H_E(M)$, such that under a brute-force attack, the number of "false-positive" valid message sequences may be increased, which naturally also increases the resultant $H_E(K)$ for that encryption cycle. Note that the number of residual valid keys $H_E(K)$ are related to the number of "valid" messages $H_E(M)$. Message equivocation augmentation is made possible by joining the encrypted entropy stream R (used for key EQAU) with the message stream M (which may also be pre-encrypted) and applying a transformation of fixed period T over the resultant joint RM message.

In addition, a 2-stage hierarchical encryption process may be used advantageously in a preferred embodiment, where the individual M and R messages (and other streams) may each be independently encrypted using an XOR in the first stage, and their joint ciphertexts may be subsequently subject to a transposition of fixed period and an XOR in the second stage. Such a configuration allows for fast encryption (due to reduced operations), unprecedented variation in cryptosystem construction, and the ability to implement a "secure/unsolvable" cryptosystem in software, hardware, within restricted key and memory limitations, and allowing for parallel multi-threaded encryption solutions.

Various principles of the invention, and EQAU in particular, may be advantageously applied to cryptographic primitives or systems which use keys or entropy as a means of providing security. Any existing cryptosystem, primitive or random number generator (no matter how weak) may be endowed with information-theoretic security characteristics merely by its incorporation into the invention, or by using the invention to transmit the ciphertext of such systems. The EQAU design framework thus allows for and requires the use of multiple independent secrecy systems working in unison, and whilst not required, any existing system can be used to encrypt the M message stream or the R entropy stream using the dynamically altered keys provided by the invention.

In addition, it is a specific objective of the invention, to allow for a general cryptographic design framework which allows EQAU to be implemented by, or incorporated with any cryptosystem or cryptographic primitive, and not to limit the implementation of EQAU to any specific solution or embodiment or cryptographic composition. In addition, the invention allows for the design and construction of an infinite number of polymorphic cryptosystems which are able to extend the practical implementation of EQAU beyond the augmentation of $H_E(K)$ or $H_E(M)$ to any property or variable of any cryptosystem, including but not limited to keys (number of keys, values, lengths, operations), entropy pools (number of, values, lengths, operations), ciphers and cryptographic primitives (number used, types, variants, encryption and decryption sequences), encryption operations (number of encryption cycles, number and variation of cryptographic operations, mathematical operations and sequences), variables (number, sequence, composition, values and dependencies), cryptosystems (composition and variations), or any other property which may benefit from the use of new entropy information as a means of increasing overall system entropy, or ensuring system "security" under our definition.

Additional advantages of the invention include: the recognition of cryptography as a scientific engineering discipline, the "secure/unsolvable" encryption of any length of data in transit or at rest using a key of finite length, the availability of a practical "QC/AI" secure cryptosystem, the adoption of equivocation as a standard cryptanalysis tool, increased encryption performance since a high workload characteristic is no longer required, the availability of "information-theoretically" secure PRNGs, a simplistic absolute definition of computer security, a mainstream paradigm shift from "insecure/solvable" to "secure/unsolvable" cryptosystems, simplification of existing security implementations in that a single "secure/unsolvable" system is used for all cryptographic requirements, the extension of cryptosystem entropy beyond the key, the capability of harmonious integration with current systems, the independence of authentication and encryption operations, the introduction of security guarantees as common industry practice, and most importantly, the adoption of a scientific-method approach to cryptographic design in that new cryptosystems may be verified by experiment to be "secure/unsolvable".

The invention improves on the existing state-of-the-art in that the cryptographic focus is on dynamic key equivocation augmentation and not dynamic key replacement. In U.S. Pat. No. 5,412,730, Michael F. Jones "Encrypted Data Transmission System Employing Means for Randomly Altering the Encryption Key" we find such a method of key replacement whereby new keys may be generated by a single independent RNG located at the sender, encrypted with the currently active key and transmitted along with normal data. Following decryption of the cipher-stream at the receiving station or entity, the encrypted keys are extracted from the datastream, decrypted, and substituted for the prior key at a predetermined or designated point in time. Unfortunately, key replacement must occur independently to be effective, and even in such a case, the rate of EQAU required cannot be sustained indefinitely.

The principles of the invention may also be applied advantageously to existing "insecure/solvable" authentication and verification security systems (used for user authentication, identification information, keys or certificates) in that these may be incorporated into the invention as a message or control stream. In addition, the current invention may be extended to include central authority control and management functions, and supporting the distribution and authentication of cryptosystem entities (users, machines, systems, data, access control and services etc.), the establishment of secure communication links between verified and authenticated entities, and the prevention of unidentified/unauthenticated entities communicating to any other entity within a security network.

In addition, the availability of "secure/unsolvable" local storage of data, allows for the implementation of two-tier encryption systems where encryption and key management may be performed independently. Advantageously, the invention satisfies all current security requirements, and is in effect a one-way function, since knowledge of the message cannot be used to compromise the keys.

In addition, the invention may be extended to provide a means for ensuring that all traffic flowing within the cryptosystem network remains behind a "secure/unsolvable" logical security boundary, whereby access to and from specific system nodes may be identified and controlled at separate user and network management level, allowing for network management functions and encryption to be kept separate. Compromise of the network does not necessarily result in a compromise of the network traffic.

These and other objects, features and advantages of the invention will be apparent to those skilled in the art, and more clearly understood by considering the following detailed description of various embodiments of the invention.

BRIEF SUMMARY OF THE INVENTION

A method for the dynamic encryption and decryption of data in transit (secure transmission) or at rest (secure storage) using equivocation augmentation (EQAU), such that where a message is encrypted using a limited length key, an independent entropy source is periodically used in a mathematical or logical operation to directly or indirectly augment or increase the residual key and message equivocation after each encryption cycle, such that under a brute-force attack on the key or message, all encryption keys become available at the start of every encryption cycle, and key equivocation and message equivocation never attain loge 1=0 for the duration of the encipherment, and thus the encipherment remains "secure/unsolvable" for any length of message.

A method for dynamic encryption and decryption of data using EQAU using a hierarchy of multiple independent cryptosystems and including: the generation and distribution of a secret key between encryption related entities; the identical synchronised initialisation of an entropy pool or PRNG by both entities; the generation of identical encryption keys; the initial independent encryption of one or more message and random sequences; the subsequent encryption of the joint encrypted sequences entailing a transformation of values and locations of values in a manner which entails message equivocation augmentation; in encryption, transmitting the ciphertext and using the previously transmitted random string to alter the current key values either directly or indirectly in a manner which augments key equivocation prior to the next encryption step; in decryption, receiving the ciphertext, decrypting (performing a reverse sequence of encryption operations to extract message, control and random sequences) and using the received random string to alter the current key values either directly or indirectly in a manner which synchronously augments key equivocation prior to the next decryption step, repeating the above operations with each encryption/decryption step.

A method for the dynamic encryption and decryption of data using EQAU suitable for implementation as a block cipher in a hardware device programmed to perform the encryption and decryption operations as per the dynamic encryption/decryption method mentioned in paragraph [0033] above.

An apparatus for the dynamic encryption and decryption of data using EQAU and including: a communication module; a processor component programmed to perform the encryption and decryption operations as per the dynamic encryption/decryption method mentioned in paragraph [0033] above.

A method for the dynamic encryption and decryption of data using EQAU suitable for implementation in a computing device programmed to perform the encryption and decryption operations as per the dynamic encryption/decryption method mentioned in paragraph [0033] above.

A means by which EQAU may be extended to any existing cryptosystem or cryptographic primitive, be it software, hardware or apparatus-based, by incorporating said cryptosystem into the above methods and apparatus of the invention as a main or subsidiary encryption step, or by using the invention to secure the ciphertext of such systems.

A method for the application of EQAU to any PRNGs capable of accepting random values, such that they may be subject to stochastic probabilistic changes in mechanics, internal states, values or variables, thereby allowing for truly random, information theoretically secure random number generation.

A method for the implementation of EQAU to a multitude of entropy pools, arrays or tables which hold key related values, entailing an encryption or mathematical operation on the existing values in the pools, tables or arrays using new entropy values, such that the values from resultant operations may "overflow" into other pools, tables or arrays, and such that the existing values of said pools, arrays and tables are periodically discarded.

A method for the implementation of the invention as a means of distributing authentication and encryption keys using a central authority, whereby existing authenticated connections between entities and the central authority may be used to construct authenticated connections between entities alone.

A method for the secure management and storage of encryption keys between encryption sessions by separating user related keys from transmission management keys, removing the requirement for session key distribution between sessions.

A method for the use of the invention as described above to secure a block chain.

BRIEF DESCRIPTION OF THE DRAWINGS

In the course of this document, reference may be made to the following attached drawings:

FIG. 1 is an example equivocation graph of four encipherments using a finite length key, illustrating their key and message equivocation characteristics.

FIG. 2 is an equivocation graph of an embodiment of the invention (XOR cipher, plaintext message and random string) illustrating the practical implementation of EQAU on the equivocation of key.

FIG. 3 is an equivocation graph of an embodiment of the invention (XOR cipher, transposition cipher, plaintext message and random string) illustrating the practical implementation of EQAU on the equivocation of message.

FIG. 4 is a block diagram of an embodiment of the invention as illustrated in FIG. 3, with the addition of an entropy pool, highlighting the various components required for the practical implementation of EQAU in a method for the dynamic encryption and decryption of data.

FIG. 5 is a block diagram of an embodiment of the invention illustrating the use of EQAU in a block cipher suitable for dynamic encryption and decryption of data in a software or hardware device FIG. 6 is a block diagram of an embodiment of the invention illustrating the use of EQAU in an apparatus suitable for dynamic encryption and decryption of data.

FIG. 7 is a block diagram of an embodiment of the invention illustrating the use of EQAU in a computer hardware device suitable for dynamic encryption and decryption of data or information.

DETAILED DESCRIPTION OF THE INVENTION

Terms and Definitions

In this document, the term "sender" or "encryptor" is used to indicate a party, entity or system which performs encryption of a message into ciphertext and "receiver" or "decryptor" is used to indicate a party, entity or system which performs decryption on a ciphertext to extract the message. "Sender" and "receiver" are primarily used with descriptions entailing encryption operations which require transmission (encryption in transit), whilst "encryptor" and "decryptor" relate to encryption operations with regards to data at rest. The parties mentioned above may be any system, machine, network, data or real person entity using an embodiment of the present invention.

As used herein, the phrases "secrecy system", "security system", "cryptosystem" or "cipher" may be used interchangeably and may refer to any system, algorithm, cipher, or a physical or logical component or element of a cryptographic system, entity or cryptographic primitive that uses, interacts with or constitutes said system, entity or primitive and which is used to perform any cryptographically relevant privacy, authentication and verification operation.

As used herein, the phrases "network entity", "system entity" or "entity" may be used interchangeably and may refer to any physical or logical component or element of the cryptosystem that uses, interacts with or constitutes said cryptosystem and which can be separately identified and authenticated using an identification number sequence. Examples of entities include but are not limited to users, machines, groups, enterprises, authorities, services, ports, keys, RNGs, entropy sequences, programs, addresses, tokens, devices, systems, configurations, components, nodes, instances, states, identifier types, ciphers, keystreams and data streams. Entities may comprise one or more other entities.

As used herein, the phrases "network node" or "communication node" may be used interchangeably and may refer to any physical or logical device that can communicate over any medium including a network, to another network node, or to itself, or to another network component within the same network node. Examples of network nodes include a Personal Computer (PC), a workstation, a server, a printer, a scanner, a facsimile machine, a copier, a Personal Digital Assistant (PDA), a storage device (e.g., a disk drive), a hub, a router, a switch, and a communication device (e.g., a modem, a wireless phone, etc.). Network nodes may comprise one or more network components. As used herein, the term "network component" may refer to a network device, or a component, piece, portion, or combination of network nodes. Examples of network components may include a Static Random Access Memory (SRAM) device or module, a processor, and a communication path, connection, port, cable, protocol, or network management system.

As used herein, the terms "network" and "communication network" may be used interchangeably and may refer to any object, entity, component, device, and/or any combination thereof that permits, facilitates, and/or otherwise contributes to or is associated with the transmission of packets, sequences, signals, and/or other forms of information between and/or within one or more network devices. Networks may be constituted of, or include a plurality of interconnected network devices. In some embodiments, networks may be virtual, neural, artificial, hard-wired, wireless, and/or of any other configuration and/or type that is or may become known. Communication networks may include, for example, any networks configured to operate in accordance with the Ethernet LAN transmission standards as published by the Institute of Electrical and Electronics Engineers (IEEE).

As used herein, the terms "data", "information" or "message" may be used interchangeably and may refer to any individual or combination of sequence, numbers, data, text, voice, video, image, message, bit, byte, packet, package, pulse, tone, waveform, and/or other type or configuration of signal and/or information. Information may be or include information packets, network management information, cryptosystem control information, datagrams, or cryptograms. Information may according to some embodiments, be compressed, encrypted, checked for errors, certified, and/or otherwise packaged or manipulated in accordance with any method that is or becomes known.

Upon reading this disclosure, those skilled in the art will recognize that embodiments of the present invention may be used to encrypt, decrypt, authorise, authenticate, verify, repudiate, propagate, alter and any number of different types of information.

Theoretical Principles of the Invention of Equivocation Augmentation

Equivocation is a logarithmic quantity which may be used as a "theoretical secrecy index" to any cryptosystem and allows for a clear distinction between "secure/unsolvable" encipherments and "insecure/solvable" encipherments, since it reflects the number of residual valid keys and messages which result from a brute-force cryptanalysis, with respect to the ciphertext characters of a particular encipherment. As illustrated in FIG. 1, with a trial of all keys, every invalid key attempt (since the decrypted message is invalid) results in a cryptosystem's $H_E(K)$ being reduced until such point where the ciphertext is at least as long as the key and $H_E(K)=H_E(M)$, and a set of all possible messages and associated keys remains. Reuse of the valid keys against subsequent ciphertext characters continues the reduction in $H_E(K)$ (and by association $H_E(M)$) until such point (the "unicity point") where $H_E(K)=H_E(M)=0$, and $\log_2 1=0$, or a single unique message has been derived.

Provided $H_E(K)$ and $H_E(M)$ are greater than 1 ($\log_2 2=1$), the system will be "secure/unsolvable" having at least two valid and probable messages (and keys). Since equivocation is an abstract mathematically-derived characteristic, quantity and concept, and since the invention entails a means by which equivocation may be engineered, a mathematical and scientific theoretical treatment of equivocation augmentation has been included in the detailed description of the invention, in order that the invention of equivocation augmentation and its practical implementation through various embodiments, may be clearly understood.

The fundamental element which distinguishes the invention from other secrecy systems, is equivocation augmentation (EQAU) or conditional entropy augmentation. Logically, if the $H_E(K)$ and $H_E(M)$ of a cryptosystem can be periodically and perpetually increased at the "perfect secrecy" point between encryption cycles, at a faster rate than it is depleted through cryptanalysis, such a system would be able to sustain its "secure/unsolvable" security guarantee indefinitely, since $H_E(K)$ key equivocation and therefore $H_E(M)$ message equivocation will be effectively prevented from ever attaining unity (be equal to loge 1=0). Note that this is also the underlying principle behind the security of a one-time pad, since key entropy is readily available (using the one-time pad) and added when required, ensuring that $H_E(K)$ and $H_E(M)$ never attain unity (are equal to loge 1=0), but are continuously augmented with new H(K) key entropy.

Whilst most dynamic encryption systems attempt to augment the entropy of a system by relying on the mechanics of providing new keys to the cryptosystem effectively replacing the old keys with new ones, this alone is insufficient to prevent a system's key equivocation from eventually attaining loge 1=0, and system compromise. As we shall see, with EQAU, the "lost" or eliminated possible viable keys (the key equivocation lost) from the original key entropy set must be replenished as soon as possible. This is assumed impossible to attain if one is limited to the use of a finite length key of known length and a single cryptosystem. However, we shall see that this "impossibility" can be overcome if one uses a finite length random key of unknown value and length, an additional independent cryptosystem, an infinite length random string, and a dynamic entropy pool, table or array.

Let us make a distinction between the key entropy H(K) and key equivocation $H_E(K)$ of a key K. H(K) denotes the entire set of all probable K keys at the start of the cryptanalysis brute-force effort, or the size of the cryptographic problem to be solved (if system entropy is limited to entropy of key). Key equivocation $H_E(K)$ denotes the reduction in the set of valid K keys (since they result in viable message decryptions) which accrues during the cryptanalysis effort. $H_E(K)$ starts with the same value as H(K) but is reduced as keys are eliminated.

For $H_E(K)$ augmentation to be possible, the value of $H_E(K)$ must be increased so that a greater number of keys are available in the next encryption cycle. For a "secure/unsolvable" secrecy system, $H_E(K)$ must at least be increased and "reset" to its initial H(K) value—the initial H(K) must be restored for the next encryption cycle. H(K) (or key uncertainty) can be increased from the assailant's perspective, after each encryption cycle or ciphertext character, by either continually introducing new independent entropy (such as with a one-time pad) or by applying a mathematical operation on any residual key values using new independent entropy values, such operation entailing a multiplication with left or right shifted bits, or any other mathematical operation as is applied in linear-feedback shift register (LSFR) random number generators, such that all possible encryption key values become available for the subsequent encryption operation which ensues after the entropy augmentation operation. As we shall see, the invention relies on the simultaneous transmission of messages and random entropy streams, such that the random streams are then used to continuously and randomly alter the current key, in effect increasing the entropy of key H(K), or from an assailant's perspective increasing the $H_E(K)$ key equivocation.

With respect to $H_E(K)$ augmentation, it soon becomes apparent that one cannot use a single K key or secrecy system to encrypt messages and new random entropy values, transmit the encrypted messages and entropy values, and then use the new entropy values to increase the key equivocation after the encryption cycle has completed, for the transmitted entropy values will be limited by the $H_E(K)$ of the previous encryption cycle. To overcome this problem, it is necessary to use an independent key and secrecy system to independently encrypt the random entropy stream R used for EQAU, before mixing the encrypted entropy stream R with the message M (or its encrypted ciphertext) in the main encryption operation using a transposition cipher of fixed period. Using such a method allows for $H_E(K)$ (in effect, the residual possible key set) to be independently increased or augmented after each encryption cycle since there is no dependency between the new R entropy values and $H_E(K)$.

EQAU has two principal objectives, namely (1) to increase or augment the key equivocation lost during encryption after each encryption cycle using an independent entropy source, such that despite an assailant reducing the possible keys down to a known set of key values, all possible keys become available for the next encryption cycle, and (2) to increase or augment the message equivocation after each encryption cycle, such that there are more viable messages than actually exist (by introducing "false positive" messages). Note that an increase in $H_E(M)$ message equivocation naturally leads to an increase in $H_E(K)$ key equivocation.

A problem with EQAU, is that the entropy augmentation process of applying a mathematical operation on the residual values using new entropy values may not always lead to a result where all key values become available again, thus does not lead to $H_E(K)$ being restored to H(K) in the subsequent encryption cycle. For example, if prior to cryptanalysis the key entropy H(K) of K is 4 bits or $2^4=16$ key values (1, 2, 3, . . . , 16), and the $H_E(K)$ key equivocation is reduced from 4 to 3 bits during cryptanalysis such that $2^3=8$ residual key values remain, say (1, 3, 4, 7, 9, 10, 11, 16), cryptanalysis, it may be insufficient to merely introduce 1 bit or $2^1=2$ new entropy values to make all possible key values available again. This may occur if there are only 2×8=16 mathematical results, and any duplication of results will result in a missing key value, and thereby will result in an incomplete augmentation of H(K), or a minor initial reduction in $H_E(K)$ at the start of the next encryption cycle. This problem may be alleviated by two known solutions: (1) by augmenting the residual equivocation (say 3 in our example) of the key directly, with a larger amount of entropy (say 2 or 3 bits instead of only 1), or (2) by deriving the 4 bit keys from the values of a larger entropy pool (of say 8 bits), and augmenting the residual equivocation of the key indirectly in that it is the values of the entropy pool which are subject to a mathematical operation.

The use of an entropy pool, or specifically, the use two or more entropy pool arrays is the preferred solution since it advantageously solves the "incomplete" conditional entropy augmentation and allows for a limited lifetime of any equivocation problem that an assailant may be trying to solve, providing a secondary reason why such a cryptosystem becomes "secure/unsolvable". Note that the primary objective of our assailant is to attempt all keys and reduce $H_E(K)$ and $H_E(M)$ to the point of where they attain unity or loge 1=0, with a single unique message or key, which renders the cryptosystem solved and thereby terminates the "secure/unsolvable" guarantee. $H_E(K)$ augmentation increases the entropy of the residual keys between every encryption cycle, such that in FIG. 2, we see that the plot of key equivocation may resemble a repetitive zig-zag "sawtooth" pattern of sharp increases and gradual decreases.

The use of an entropy pool of specific construction, one that discards all resident values after a specific number of encryption cycles, effectively limits the lifetime of any key equivocation calculation to a specific number of encryption cycles. Consider the use of one or more entropy pools (A, B, C, . . . ) which is composed of one or more arrays, tables or states which can hold entropy values, such that any one pool, array, table or state (A) is considered "active" whilst the others (B, C, . . . ) are considered "passive". The "active" array A (of at least twice the size of the key in play, which may be variable) serves two functions: (1) the values of the current encryption key(s) K are derived from predetermined or random locations in the "active" array prior to encryption such that K=(A[2], A[7], A[6], . . . etc), and (2) after each encryption cycle, a mathematical operation such as A'=(A[0, 1, 2, . . . n] *R)+1 is applied against the existing values of the "active" array A using the new random entropy values R, effectively indirectly augmenting the equivocation of key $H_E(K)$ of the cryptosystem (at least from the assailant's perspective), but in essence augmenting the entropy H(A) in the "active" array A. Note that the resultant mathematical calculation of the values of the existing "active" array with the new entropy values, will result in a buffer "overflow" of values with regards to the "active" array A. The function of the "passive" array B is to receive the "overflow" values from the "active" array A until B is "full" and overflows itself. This overflow may in turn be received by "passive" array C, but ultimately once array B has a full set of values, array A and array B may switch "active/passive" roles, such that the previously "active" array A may have its values or contents flushed, and become a new "passive" array, ready to receive "overflow" from the now "active" array B. Array B then serves its "active" role as the source for the current encryption keys. Note that the flushed values from array A may be recycled, by returning them to the local random number generator or some other destination. The frequent flushing of array values presents a unique problem to the assailant from a key equivocation perspective, since it limits the lifetime of any key equivocation calculation to an unknown but limited number of encryption cycles (note that the size of the arrays need not be known, and may vary dynamically). It effectively renders augmented key equivocation a P complete problem.

As we shall see in FIG. 2, it is possible to send a plaintext message M and a random message R simultaneously in the same encryption cycle, and ensure that a greater amount of EQAU entropy H(R) is transmitted between sender and receiver in than may be lost in $H_E(K)$ in the encryption/transmission process of that encryption cycle. From FIG. 1, we noted that the plaintext message M1 experience a reduction in $H_E(K)$ due to the encryption process, which was proportional to the amount of redundancy in the message, in that the greater the redundancy, the greater the loss in $H_E(K)$. However, the M3 random (entropy) message did not experience any reduction in key equivocation $H_E(K)$ during the encryption process (for it had no redundancy).

Shannon stated that the message equivocation $H_E(M)$ of a product system S=TR, where T and R are two independent secrecy systems, is not less than with R alone. Product systems are effectively super-encryption systems, since they entail the encryption of a message by two independent secrecy systems, and have a unique $H_E(K)$ property. A message encrypted twice with two independent XOR encryptions, each using a separate key K1 and K2 with entropy H(K1) and H(K2) as long as the message, loses no $H_E(K2)$ with K2 on the second XOR encryption. This is trivial to determine. Consider two keys K1 and K2 having a value between 1 and 10 such that K1=4 and K2=6. K1 and K2 are used to XOR encrypt a message M which may have any one of two values from the set {1,2}. Assume M=2. The resultant ciphertext would essentially entail C=(M+K1)+K2) mod 10=2+4+6 mod 10=12 mod 10=2. Since C=M+(K1+K2), K1 and K2 must add up to either 1 or 0. There are 2×10=20 possible combinations of K1 and K2 which could add up to 1 or 0. Since there are two possible K1 keys if K1 is considered alone, K2 loses no equivocation. Note that this rule is equally applicable even when M is a known plaintext message which is XOR'd with K1 and K2. Since the assailant has knowledge of M he will also know what the modular addition of K1 and K2 must be, but there is no way for him to determine which of 1×10=10 possible K1/K2 combinations was used. This rule is equally applicable where an XOR and a transposition are used—only the effective $H_E(K)$ of the first XOR encryption key is lost, but not of the other keys or ciphers.

It should be clear at this point that $H_E(K)$ and $H_E(M)$ are values of particular interest to an assailant, since they indicate the predictable effective rate of success of any cryptanalysis effort, and also indicate the length of ciphertext required to solve an encipherment. Ciphertexts which are shorter than the "unicity distance" have an increased probability of being "secure/unsolvable" and are thus unlikely to be brute-forced, since the computational effort required may not prove fruitful (two or more probable messages), and "insecure/solvable" encipherments are easier to justify from a resource cost perspective. However, one must assume that a QC/AI (Quantum Computing/Artificial Intelligence) assailant will attack any and all encipherments, whether they are "secure/unsolvable" or "insecure/solvable", since even a set of residual probable messages may be further reduced after the fact through alternative logical means or upon new metadata becoming available. It is under this greatly significant threat that we will consider the practical implementation of key and message equivocation augmentation.

The most basic embodiment of the invention as shown in FIG. 2 entails the use of a repetitive encryption cycle of 2 characters composed of two independent cryptosystems S and T, such that S entails an XOR encryption of a message character M[0] with an 8-bit key $K_S$, and T entails an XOR encryption of a random character R[0] with an 8-bit key $K_T$. Between each cycle, the R values may be used to augment the entropy pool from which $K_S$ is derived. Note that $K_T$ is never augmented to maintain its independence. The problem with such an embodiment, is that it offers limited protection against a known plaintext M with regard to $K_S$ since knowledge of $K_S$ allows the equivocation of the entropy pool to be derived, and even with the periodic flushing of the entropy pool, some reduction in the $H_E(K_T)$ is inevitable between flushes. Thus this embodiment only allows for a limited period "secure/unsolvable" guarantee under a known plaintext. The primary issue is that R is unprotected from reductions in the key equivocation of the entropy pool unless it is encrypted twice with at least one XOR. In order for EQAU to be viable, it must not be possible to derive the key of the cryptosystem, under encipherments where the assailant is aware of the message being encrypted.

In FIG. 2, we demonstrate the equivocation graph for a basic embodiment of the invention wherein EQAU is applied to $H_E(K)$ using an encryption hierarchy, such that encryption occurs in encryption cycles, using a key K derived from several values of a dynamically altered entropy pool. With this embodiment, a local PRNG is used to produce a random string R whose encryption key is protected against cryptanalysis using two subsequent XOR encryptions, and we demonstrate the resultant equivocation of key $H_E(K)$, message $H_E(M)$ and random string $H_E(R)$ over three encryption cycles 201, 202 and 203 of 4 bytes each. A key K of 48 bits is derived from various locations of an entropy pool, and is split into K1 (32 bits) 204 and K2 (16 bits) 205. Encryption is hierarchical in that each encryption cycle is composed of a primary 206 and secondary 207 encryption stage. In the first encryption cycle K2 is used in the secondary XOR encryption 207 of two random message characters R[0] and R[1] resulting in ciphertext CR[0] and CR[1]. K1 is used in the primary XOR encryption 206 of two message characters M[0] and M[1] and the ciphertext CR[0] and CR[1], resulting in four ciphertext C characters (C[0], C[1], C[2], C[3]). Note that R[0] and R[1] are subject to two XOR encryptions (one at each hierarchy level).

At the start of the encryption cycle denoted by point 208, the entropy of message H(M) is equal to the equivocation of message $H_E(M)$, and both start with value equal to 0. Thus $H(M)=H_E(M)=0$. Likewise with key K1, at point 209 the entropy of key K1 given as H(K1) is equal to the equivocation of key K1 given as $H_E(K1)$, thus $H(K1)=H_E(K1)=32$, and with key K2 at point 210 $H(K2)=H_E(K2)=16$. Since $K=\{K1\|K2\}$, point 210 is also the point where $H(K)=H_E(K)$. For the purposes of demonstration, we will use an English message and assume it to have 1.3 bits of information for every 8 bits. The beginnings of English messages normally have a higher rate of information (around 2.4 bits) and this drops to around 1.3 after about 30 characters. Note that equivocation augmentation is possible irrespective of the amount of redundancy in a plaintext message. Thus, equivocation augmentation is not affected detrimentally by known plaintext messages. The assailant has knowledge of the system, and is aware that ciphertext characters C[0] and C[1] relate to the message M characters M[0] and M[1], and thus can plot the slopes of $H_E(M)$ and $H_E(K1)$ from points 208 and 209 respectively, towards the "perfect secrecy" point for 4 character messages denoted by 211. Whilst we have plotted 211 as having a value of $2^{4*1.3}=2^{5.2}=36.7$ viable 4-letter English character combinations, as mentioned, there are more in reality. In any event, upon brute-forcing all keys of K1, the slope of $H_E(M)$ depicts the rate at which valid character sequences are found, and the slope of $H_E(K1)$ depicts the rate for "invalid" sequences. These slopes are dependent on the redundancy in the language. The greater the redundancy in a language, the lower the value at point 211. After two M characters, $H_E(M)=2.6$ at point 212, and $H_E(K1)=18.6$ at point 213. H(K1) therefore is trending toward a "unicity point" at point 214 which will have a value of 38.09 bits or 4.76 characters (H(K)/D=32/0.84=38.09). The assailant will also be aware that ciphertext C[2] and C[3] is the XOR encryption of CR[0] and CR[1], the resultant ciphertext from the XOR encryption of random string characters R[0] and R[1]. Since CR[0] and CR[1] have no redundancy, thus suffer no key equivocation loss after an encryption, the slope of $H_E(K1)$ will trend horizontally from point 213 to point 215. The equivocation of R $H_E(R)$ will therefore be plotted from point 213 to meet $H_E(K1)$ at the new "perfect secrecy" point 215 which has a value of 18.6 (16+2.6) bits (equal in value to point 213). In other words, at point 215 after cryptanalysis there will remain $2^{186}$ keys which correlate to $2^{186}$ MR (plaintext∥random) messages, composed of $2^{26}$ M plaintexts concatenated to $2^{16}$ R random texts. Thus we see that the joining of random strings such as R to M will reduce the average redundancy of the joint MR message for the first encryption cycle and move the "unicity point" from point 214 to point 216, where it has a value of 9.27 characters or 74.20 bits (32/((32−18.2)/32)=32/0.43=74.20). Note that the equivocation of message $H_E(M)$ and equivocation of key $H_E(K1)$ is significantly increased from point 211 (5.2) to point 215 (18.6) due to the equivocation of the random message R denoted as $H_E(R)$. In order to derive the values of R[0] and R[1] the assailant must solve for both K1 and K2. In addition, as we shall see, even prior knowledge of M or the values of R[0] and R[1] does not allow the assailant to solve for all K1 and K2, since the values and size of the entropy pool are unknown.

Ordinarily, $H_E(M)$ will always rise to meet a descending $H_E(K)$, or in our case $H_E(M+R)$ will rise to meet a descending $H_E(K1)$. Once $H_E(M)$ meets $H_E(K)$, it will follow its downward trend to unity (loge 1=0) as previously "valid" character sequences are rendered "invalid". The objective of the invention is to continually raise the entire key equivocation $H_E(K)$ between encryption cycles. Therefore after the first encryption cycle, the entropy or values of R[0] and R[1] are used by the sender and receiver to synchronously augment $H_E(K1)$ only (K2 is always independent and need not have its equivocation augmented since it never loses any) by applying a mathematical operation on the entropy pool source of K1 (as mentioned above) at point 217, such that it has the potential in theory to increase $H_E(K1)$ to a value of 34.6 (18.6+16) at point 219, which exceeds the original H(K1) at point 209 of 32. Naturally, if K1 was a key of fixed length, its key equivocation $H_E(K1)$ could only be raised to point 218 which is equal to H(K1)=32. Since $H_E(K2)$ experiences no key equivocation loss (due to XOR encryption of a random string), it runs parallel to $H_E(K1)$, going from point 210, to point 219 and is raised to point 220 with the subsequent equivocation augmentation of K1. Thus at the beginning of the next encryption cycle at point 220, the total entropy of key K, H(K) has been reset to the original value at 210, since all keys are again available. Note further, that the augmentation of the entropy of the entropy pool or source from which K1 is derived, using R[0] and R[1], augments the key equivocation of K1 (makes all keys available), but does not augment or increase the joint equivocation of the plaintext message $H_E(M)$ and the random message $H_E(R)$ above point 215. In effect, we see that random strings are one means of raising the equivocation of messages. In the subsequent FIG. 3 graph we demonstrate a separate technique which is used to specifically augment both $H_E(M)$ and $H_E(R)$ even further.

Ordinarily, if one uses an entropy pool as an entropy source to derive K1, and a fixed length K1 is used, $H_E(K1)$ the augmented key equivocation value at point 218 can never be greater than the key entropy H(K1) and therefore will be equal to its original value at 209 and $H_E(K1)$ and $H_E(K2)$ will in effect be reset to the values 206 and 207 between each and every encryption cycle. Note that $H_E(K2)$ will remain a "passive" bystander and suffer no equivocation loss itself as long as K2 remains independent and not subjected to equivocation augmentation. Thus the entropy pool source of K1 will benefit from the excessive entropy augmentation after each encryption cycle, but the entropy of K1 will be limited to H(K1). With regards to equivocation of message M only, $H_E(M)$ will continue trending upwards from point 221 (it's an extension of point 212) until it meets $H_E(K1)$, but can never exceed the initial K1 key entropy H(K1) at point 209, whereupon it will trend horizontally towards infinity in the same manner as is found with the equivocation of random strings (see FIG. 1, with specific reference to message M[3]). In addition, the use of an entropy pool for equivocation augmentation, does allow for the possibility to increase K1 and K2 in length, therefore allowing for H(K1) and therefore H(K2) to exceed their initial entropy sizes, say by altering H(K1+K2) to a 12-byte or 96-bit key, but this requires an increase in the encryption cycle as well and is largely academic for two reasons: (1) the entropy pool is flushed after a fixed number of augmentations, so increasing H(K1+K2) provides no additional "secure/insolvable" advantage by increasing the number of viable message and keys, and (2) $H_E(K)$ and $H_E(M)$ have no possibility of ever attaining—even if a known plaintext message is used, so such a change would provide no real security benefit but merely increase the "safety" of an already "secure" system. The key equivocation augmentation process is then repeated ad nauseum after every encryption cycle, with one fundamental result—$H_E(M)$, $H_E(K1)$ and $H_E(K2)$ are prevented from attaining unity through constant augmentations and no key repetition, and thus the "secure/unsolvable" guarantee zone for M and R denoted by 222 will extend to infinity—maintaining information theoretical security, irrespective of the length of M. Note that in the case of a fixed length K1 and K2, the values of H(K1), H(K1)+H(K2), and $H_E(M)+H_E(R)$, as denoted by 229, 230 and 228 will be constant and horizontal with every encryption cycle.

Ordinarily, over the course of many encryption cycles, we will see from the upward trend line denoted by point 227 that $H_E(M)$ will eventually converge with $H_E(K1)$. $H_E(M)$ will only trend downwards when it meets and follows $H_E(K)$ on a downward trend, as previously "valid" message sequences are rendered "invalid". With equivocation augmentation, this downward trend of $H_E(K1)$ is temporarily altered and reset to the original H(K1) value, so any downward trend on $H_E(M)$ meeting $H_E(K1)$ can only ever be temporary. In addition, the rate of key equivocation augmentation can be guaranteed to be greater than the rate of $H_E(K)$ loss, even in the case of a known plaintext message M where the length of R is equal or greater than the length of M in every encryption cycle. Also, the additional knowledge of the random string R values is insufficient to reduce $H_E(K2)$ to log₂ 1=0, since there is a $H_E(K1)$ dependency, and $H_E(K1)$ is derived from the augmented equivocation of the entropy pool, or specifically, the equivocation of the initial key K used to populate the entropy pool and the entropy pool structure at the start of encryption operations.

There are some security concerns to ensure that the EQAU process is effective and efficient and that it is able to recover from message and random string compromise. In the previous embodiment in FIG. 2, we must assume that from the assailant's perspective, the message ciphertext {C1, C2, C5, C6 . . . }, is clearly identifiable and distinguishable from the random ciphertext {C3, C4, C7, C8, . . . } and there is a possible risk that these separate encipherments may be cryptanalysed as two separate systems, one relating to the message M and the other to the random string R such that the assailant may separately calculate message equivocation $H_E(M)$, random equivocation $H_E(R)$, and key equivocation He(K), and thereby derive the equivocation of the entropy pool (actually the equivocation of the initial key K and the entropy pool variation), thus reducing the efficiency of the entropy augmentation process. The risk mentioned above is increased in the case of where message M may contain known plaintext such as HTML headers, in that after cryptanalysis of the first 4 ciphertext characters, if message values M[0] and M[1] are known, the values for K1[0] and K1[1] will also be known, and the result is $H_E(M)=H_E(K1[0])+H_E(K1[1])=\log_2 1=0$.

The distinguishable ciphertext problem (message ciphertext distinguishable from random ciphertext) may be addressed through the use of a transposition with fixed period cipher, since message M and random message R strings will be indistinguishable from the ciphertext alone, and thus a transposition in effect increases $H_E(M)$, since there are now additional viable (but false) message decryptions due to the random channel. In addition, the secondary XOR (or other cipher) encryption of the message M using an additional dynamically augmented and altered or independent static key solves this problem. Indeed, any existing "insecure/solvable" cryptosystem may be used for the task (although it may be considered too slow for actual use).

As previously mentioned, EQAU can only occur if one uses a separate independent "secure/unsolvable" encrypted channel for the random entropy transfers or transmissions. This is addressed by an XOR encryption of the random string prior to it being concatenated to the message and encrypted by the main XOR and transposition operation. This will result in the random message R effectively being exposed to two subsequent XOR encryptions, ensuring that only one XOR experiences a decrease in $H_E(K)$. Even in the case of a known plaintext, the keys used in the two XOR encryptions cannot be compromised. Lastly, since some key equivocation is required for augmentation to occur, and since key equivocation decreases continuously, it is best to apply the equivocation augmentation process at the earliest possible moment, namely at the "perfect secrecy" point, where $H_E(M)$ is at its maximum after an encryption cycle has ended.

We shall now concern ourselves with the secondary means of EQAU of $H_E(M)$, or specifically, a means of increasing the number of viable and probable messages produced as a result of a brute-force attempt on the key.

Upon a brute-force attack on the key K, any increase in the number of viable messages (increase in the slope of $H_E(M)$) will result in an equal increase in the number of valid keys (decrease in the slope of $H_E(K)$). Thus, EQAU of $H_E(K)$ between encryption cycles allows $H_E(M)$ to continue increasing in the next cycle until it meets $H_E(K)$, whilst increasing $H_E(M)$ in an encryption cycle reduces the decrease in $H_E(K)$ during that encryption cycle.

In FIG. 3, we demonstrate the equivocation graph for an embodiment of the invention where message and random streams are encrypted in secondary XOR encryptions and a transposition with fixed period operation is added to the primary XOR encryption step, in order to demonstrate the impact of augmentation of $H_E(M)$ specifically. Again, we demonstrate the resultant equivocation of key $H_E(K)$, message $H_E(M)$ and random string $H_E(R)$ over three encryption cycles 301, 302 and 303 producing 4 ciphertext characters each. Each encryption step entails the concatenation of two message M characters, and two random R characters. A key K with entropy H(K)=80 bits is produced from an entropy pool and is split into 3 separate keys {K1, K2, K3} such that at point 304 H(K1)=32 bits, at point 305 H(K2)=32 bits, and at point 306 H(K3)=16 bits. K3 may be initially derived from the entropy pool, but its equivocation is not subsequently augmented. Each encryption cycle is composed of an encryption hierarchy such that encryption 307 occurs at a secondary encryption stage, whilst 308 and 309 occurs at the primary encryption stage. In the first encryption cycle of 4 bytes, a random number generator is used to produce the random string R, and K3 is used to XOR encrypt 307 two random R characters producing CR[0] and CR[1], which is subsequently joined to two message M characters M[0] and M[1] and their joined result is super-encrypted (encrypted twice) using key K1 for the XOR 308 and key K2 for the transposition of period 4 at point 309. The order of the 308 and 309 encryptions is not ordinarily relevant, but in our example, the XOR is done before the transposition. This encryption hierarchy is repeated with all subsequent encryptions.

We will now conduct the equivocation analysis of the cipher from the perspective of a determined QC/AI assailant having access to infinite computing, time and logical resources. The assailant will have intercepted the sequence of ciphertext C={C[0], C[1], C[2], CPI C[4], C[5], C[6], C[7], C[8], . . . , C[n]}, where n+1 is the length of the ciphertext C, and we shall assume that he will also have prior knowledge of the encryption mechanics of the specific embodiment used (encryption cycle of 4 bytes, two M and two R), but not the key K, the message M, or the random string R. We will deal with the scenario where the assailant has knowledge of the message M or parts of message M later. In order to ascertain whether a brute-force attempt is viable, the assailant will first attempt to determine the "unicity point" of the embodiment—if the ciphertext is longer, a brute-force attempt is viable, if shorter, there's no point to a brute-force attempt, since there will be multiple valid messages and the encipherment will be "secure/unsolvable".

Prior to cryptanalysis at point 310 the entropy of message H(M) is equal to the equivocation of message $H_E(M)$, both being equal to 0 (having no message is a known quantity). Thus $H(M)=H_E(M)=0$. Likewise with key K1, at point 311 $H(K1)=H_E(K1)=32$, with key K2 at point 312 $H(K2)=H_E(K2)=32$, and with key K3 at point 313 $H(K3)=H_E(K3)=16$. An additional key K4 having H(K4)=16 may be added as a means of encrypting the message M, and K4 may have its equivocation augmented (or may be kept independent and not augmented) in a similar manner to K1 and K2. K4 has been excluded from FIG. 3 to simplify the demonstration of message equivocation augmentation. We shall assume that the assailant has prior knowledge that the message M is an English message having 1.3 bits of information and 6.7 bits of redundancy in every 8 bits.

With respect to key K1 (used for the primary or main XOR encryption, over two M characters and two R characters, producing ciphertext C[0] and C[1], assuming that these are the XOR encryptions of M[0] and M[1]), $H_E(M)$ will rise from point 310 and trend towards the "perfect secrecy" point 314. Since there are only two message M characters, $H_E(M)$ will stop at point 315, and have a value of 2.6 bits. In a similar manner, $H_E(K1)$ will descend from point 311 and trend towards the "perfect secrecy" point 314, stopping at point 317 with a value of 18.6 bits (2.6+16). Projecting the $H_E(K1)$ slope through point 314 results in a "unicity point" 319 of 38.2 bits (32/16.25%)

As mentioned above, K2 is a 32-bit key which is used with the transposition over fixed period cipher. A benefit of transposition is that with the transposition of period 4 (over four encryption characters), there are 1*2*3*4=24 possible ways that {C[0], C[1], C[2], C[3]} can be "shuffled" with a key K2 having entropy H(K2)=32 bits. Since K2 is unknown, all 24 possible "shuffle" combinations will result following a brute-force of key K2, only one of which is correct and 23 are "false" positives. Irrespectively, this results in an increase of $H_E(M)$ from 2.6 (at point 315) to 7.12 bits (at point 316). An increase in $H_E(M)$ therefore results in an increase in the slope of $H_E(M)$. Projecting $H_E(M)$ from point 310 through point 316 results in a new "perfect secrecy" point at 320. Due to the increase in $H_E(M)$, $H_E(K1)$ is increased from point 317 (18.6 bits) to point 318 (23.12 bits), and this can be identified when one projects $H_E(K1)$ from point 311 through point 318 to point 320 (with value 14.24 bits). Projecting from 311 through "perfect secrecy" point 320 establishes a new "unicity point" at point 321. Since C[2] and C[3] are the XOR encryptions of CR[0] and CR[1], themselves a result of an XOR encryption of random characters R[0] and R[1], the equivocation of R, $H_E(R)$, will be horizontal such that point 322 will have the same value as 318, and $H_E(K1)=H_E(M)+H_E(R)$. An increase in the number of bytes in an encryption cycle will therefore increase the value of point 322, such that with 6 bytes, having 720 possible "valid" decryption combinations, it will be 13.38 bits (3.9+9.48). However, K1 and K2 will both need to be increased to 48 bits each and K3 will be 24 bits in size, to accommodate a 6-byte encryption cycle.

At point 322, our "[M, M, R, R]" message has 23.12/4=5.78 bits of information for every 8 bits, with 2.22 bits or 27.75% of redundancy. The "unicity point" 323 for the "2M2R" message is therefore 32/0.2775=115.31 bits or 14.41 characters. Thus, if the ciphertext was only 14 characters long, the "[M, M, R, R]" message would in principle be "secure/unsolvable".

The effective $H_E(K1)$ (point 311, 318 and 322) and $H_E(M)+H_E(R)$ (310, 316, and 322) is therefore an average of the equivocations over the entire "[M, M, R, R]" ciphertext, and this is the first benefit of the application of the transposition cipher using key K2 which follows the XOR encryption with key K1. So, not only does the random string R decrease the overall redundancy in a combined MR message, but transposition which follows an XOR will raise $H_E(M)$ and $H_E(R)$ by the size of the key used. Thus, with H(K1)=32 (for the XOR encryption) and H(K2)=32 (for the transposition encryption), there are $2^{55.12}$ viable MR messages at point 324, an enormous increase from $2^{5.2}$ using 4 message characters alone.

As demonstrated in FIG., the subsequent mathematical EQAU operation 325 using R[0] and R[1] applied after the first encryption cycle to an entropy pool to derive the new keys for K1 and K2, but not K3, will raise $H_E(K)$ by the R decrypted values, such that $H_E(K1)$ will be augmented by R from point 322 to 326, $H_E(K1)+H_E(K2)$ will be augmented from point 324 to 327, and $H_E(K1)+H_E(K2)+H_E(K3)$ will be augmented from point 328 to 329. Since we have limited our embodiment to fixed K lengths, the increase in equivocation will result in $H_E(K)$ returning to the original entropy of key $H(K)$ values. As with the embodiment demonstrated in FIG. 2, the equivocation augmentation process is repeated ad nauseum, with one fundamental result—$H_E(M)$, $H_E(K)$ and $H_E(R)$ will never hit unity or $\log_2 1=0$, and thus the security guarantee zone for M will extend to infinity—maintaining information theoretical security, irrespective of the length of M.

Ordinarily, in practice, $H_E(K1)$ will have a varying rate of decay with each encryption cycle, but in general, $H_E(K1)$ will average out to the levels as indicated by point 318, 330, 331 and 332. $H_E(M)$ will increase with every encryption cycle, as denoted by points 333, 334 and 335. However, it is at points 336 and 337 that we see the case where $H_E(M)$ meets $H_E(K1)$, at a new type of "perfect secrecy" point, such that $H_E(M)$ follows the downward trend of $H_E(K1)$, until $H_E(K1)$ is augmented. At this point, the cryptosystem enters a state of "equivocation equilibrium", guaranteeing that the security guarantee zone 338 can be extended to infinity. In the case of where a known plaintext comes into play, $H_E(M)$ is never reduced below point 322, indeed, it cannot be reduced below any previous $H_E(M)$ gained, for it will trend horizontally.

In addition it should be noted that even in the case of a known plaintext message M, the use of an XOR and a transposition makes it impossible to derive any of K3, K2, or R. Where characters of Mare composed of known plaintext, $H_E(M)$ will trend horizontally, and $H_E(K)$ will always be augmented to its initial value by R and will follow a horizontal trend to infinity.

However, the embodiment has the following interesting characteristics: (a) the key K need not be limited to a specific length, and may be of unknown length—thus the assailant will have to try all possible variations in key length, increasing the overall $H_E(M)$, (b) the key may be derived as a subset of a larger key entropy pool, such as a rotating key, or the internal state of a random number generator, (c) the entropy pool may itself be expanded over time, whilst keeping encryption cycles fixed in length, (d) the encryption cycles may be increased or decreased in length whilst in operation, for example dynamically changing from 4 byte cycles to 6 byte cycles as the available $H(K)$ allows, (e) the message M may be itself encrypted with an XOR (or other cipher, or cipher combinations) much like the random message R, (f) the message M may be encoded or subject to a transposition before being encrypted.

The simplest description of the invention, is that information theoretic secrecy can be attained if one uses two or more independent cryptosystems R and S, each using independent keys $K_R$ and $K_s$, such that system R entails the encryption of a random stream (requires a random number generator) and serves as a secure dynamic entropy (or equivocation) delivery channel which is mixed with the message M and subsequently protected when encrypted using system S. R and M are therefore encapsulated by S.

Note that $K_R$ must ideally be kept independent from $K_s$ at all times and need not be "equivocation augmented", since a static key is sufficient to secure the random entropy supply perpetually. Having said that, $K_R$ may be optionally included in the equivocation augmentation process, if the encryption keys are derived from an entropy pool, but this is not recommended.

From the embodiments of the invention described in FIG. 2 and FIG. 3, we may make the following deductions with regards to EQAU: (a) since $H_E(K)$ and $H_E(M)$, the equivocation of key and message never hit unity, or $\log_2 1=0$, the EQAU principle effectively guarantees that the system is information theoretically secure. It cannot be compromised using brute force and infinite time alone, irrespective of whether the attack is focused on the ciphertext C, the message M or the key K, (b) even in the case of a known plaintext message M, it is not possible to completely compromise the entire key K, due to the "double XOR" encryption of the random stream R, which is a random unknown sequence or message, (c) repeating the encryption operation using the same key K and message M will in the greatest of possibilities result in a different ciphertext being produced, (d) "perfect secrecy" is not the best that can be attained, since "perfect secrecy" can be exceeded in a number of ways including the use of EQAU, in that the a posteriori message probabilities may be made larger than the a priori message probabilities. This is evident where the message equivocation $H_E(M)$ may be "artificially" increased through the use of a transposition of fixed period, and the use of random string messages. In addition, random string additions may be variable in length, allowing for the true length of message M (and thus the random string lengths as well) to be hidden, making a priori message probability calculations literally impractical. Note that plaintext message to random message ratios need not be fixed and may be dynamic and thus the assailant must consider all possible message/random message combinations, (e) the uncertainty of a cryptosystem need not be limited to the entropy of key, (f) that it is possible to information-theoretically secure any message M using a key K of limited length, irrespective of the length of the message, (g) since the principle of equivocation augmentation does not rely on a high workload characteristic, the cipher is fast due to simplified mechanics, (h) the simplified mechanical hierarchy ensures that the invention may be implemented with small keys—a key of at least 80 bits is sufficient to guarantee security, the encryption operations may be performed in a memory space of 20 bytes, the entire invention may be implemented using any number base (2,8, 16, 32, 64, 128, 1024-bit, etc.), and it is in general trivial to create a bespoke variant.

Any cryptosystem of fixed length key K, fixed deterministic encryption operations, used to encrypt a message M of known length (ciphertext length=message length), may be subjected to equivocation analysis by an assailant after the ciphertext has been intercepted, in order to identify the size of the cryptographic problem to be solved. The assailant may then choose to attack the cipher or ciphertext from two possible attack angles=either by attacking the key or the message. An attack on the key will almost always entail a method whereby entire key sections will be eliminated. When encountering a key with a viable first block encryption output (a viable message), the key may be subsequently verified against the subsequent blocks. Ordinarily, if a key remains valid for any ciphertext after the "unicity point", it will in great probability be the only viable message, and thus the search will be terminated. However, in practice it is usually the message with its reduced probability that is attacked, and a known plaintext message is specifically vulnerable. Since all HTTP and XML protocols have predictable headers, they are a known plaintext security risk. The use of any cryptographic solution which does not contain a specific proof that it is impossible to create a "reverse-algebra" algorithm that may be used to solve for the key, or a reduced set of keys, is cryptographically flawed from a design perspective, since it has a built in "back-door", and cannot be regarded as being secure.

The embodiment of the present invention as shown in FIG. 3, and all other embodiments of the invention do not rely on a high workload characteristic as a basis for security, since workload increases "safety", but not system "security". The mechanics of encryption of the invention are relatively limited, and the cryptographic problem used does not rely on mathematical assumptions of complexity, eliminating the possibility of "pseudo-secure" problems which appear to be difficult, but are not necessarily so to an assailant with the required knowledge. Embodiments of the invention may be resistant to a known plaintext attack aimed at deriving the key K, in that given a known plaintext message M, say a null string "[0, 0, 0, . . . 0]" of infinite length, it is not possible to deduce any of the key K sub-keys (304, 305, 306), since even after deducing all key possibilities (calculating the $H_E(K)$ key equivocation) that could have resulted in the first enciphered block, the random entropy R[1] and R[2] available for equivocation augmentation at the end of each encryption cycle, exceeds the number of possible keys which have been eliminated in that cycle (since they did not produce a valid decipherment. Each new encryption cycle will be essentially presenting the same key possibilities (326) as were encountered in the previous step. The cryptographic problem is being increased at a faster rate than it is being resolved. It cannot be resolved by an attack on the message.

In addition, the composition of the embodiment key and encryption block structure need not be of a fixed type, but may be altered initially in key length and encryption mechanics for each individual encryption session, or may be altered dynamically between encryption cycles. Consider that the length of M, R and K may not necessarily be fixed, and that a determined assailant is intent on cryptanalyzing (attacking) an embodiment of the present invention as contemplated in FIG. 3—the first problem for the assailant to solve, is deducing what the key length of K is (304, 305, 306), followed by the composition of the exact cipher block of M and R characters, and these problems inevitably increase the range of probabilities of viable messages when trying all possibilities—thus increasing the "effective" $H_E(M)$ message equivocation in play, since there are multiple independent instances of $H_E(M)$ in play.

Let us assume that the assailant is aware of the key length and the composition of the current embodiment of the invention and that it is configured as per the example in FIG. 3. With every additional message character, the message equivocation $H_E(M)$ of the cipher is increased. This increase will continue until such a point where message equivocation $H_E(M)$ and key equivocation $H_E(K)$ are equal (perfect secrecy). Since the lost entropy of K is being replaced at a faster rate than it is being consumed, even with a fixed length encryption block, the result will be that "perfect secrecy" will be attained with every encryption cycle, to infinity. This is irrespective of the message length. There will always be a guaranteed minimum message equivocation (a guaranteed number of viable messages). It is a specific objective of the current invention that with an understanding of the effects of equivocation augmentation and reduction, it may be possible to effectively engineer cryptographic configurations of key length, size of random entropy channels, and other characteristics, which will result in a specific calculated number of viable residual messages and key being produced from the cryptanalysis of the resultant ciphertext. Thus cryptographically, the two attack vectors on the cipher are not viable, and do not result in a unique viable and probable message. However, it may be possible that side-channel attacks on the cipher may be possible, but this is may be addressed using multiple threads.

There are a few caveats to be considered with the practical implementation of "equivocation augmentation": (a) the addition of random strings (used for equivocation augmentation) to messages will result in an increase in initial message length of at most 100%, however this is the price to pay for infinite "secure/unsolvable" encipherment, (b) equivocation augmentation requires an ordered sequence of encrypted ciphertext which makes it prone to packet dropout or transmission error during the communication process. Error correction and recovery may be performed by the decrypting entity with regard to the specific application or network protocol used. With the TCP/IP protocol, recovery may for example include the retransmission of failed packets, (c) the process used for equivocation augmentation of sending entropy/equivocation information in previous packets makes it vulnerable to error propagation. Error propagation and correction may be addressed in a similar manner as denoted in the previous point by the communication protocol, by the application in use, or it may be addressed through the use of one or more control information channels or streams which may be added to the main encryption process, such that control information may include packet or message checksums, or message authentication and validation information. Invalid message formats may be identified and retransmitted, (d) a "truly random" information-theoretically secure random number generator is preferred in order to generate truly random sequences. Current "industry standard" pseudo random number generators (PRNGs) are not up to the task for they use deterministic predictable mechanics and are also susceptible to the key equivocation problem that renders cryptographic systems "insecure/solvable". Thus, we demonstrate a means of applying equivocation augmentation to new and existing PRNGs, as a means of altering their deterministic mechanics in a probabilistic stochastic manner, making them "truly random" and "secure/unsolvable", (e) the encryption system and key used for the secure transmission of equivocation augmentation entropy "changes" must be independent from the system and key used for message encryption, and ideally should not be augmented. This issue is addressed by using two or more independent cryptosystems, and (f) for obvious reasons, equivocation augmentation cannot be applied directly to any previous fixed finite length key used for encryption, no matter how long, since the key equivocation can only be increased if all keys become possible in the next encryption cycle. This issue is addressed through the use of an entropy pool, in the form of a queue, table or array which may be used to hold random values, and perform mathematical operations on their values or locations in the pool.

The increase in message size is justified considering advancements in communication throughput, and since it is the necessary "penalty" to be paid for "secure/unsolvable" encipherment. Note that one-time pads require this penalty to be paid up front. In addition, it is the threat of message expansion, and not its actual use which is of cryptographic benefit, since without knowing the actual length of a message, an assailant has to expand his search probabilities to include all plaintext/random/other message block combinations, and this inevitably results in an artificial increase in overall system equivocation $H_E(S)$, the logarithm of all possible message/random text combinations. Introducing control information, or multiple message/random sequences to the cryptosystem, increases $H_E(S)$ even further. An increase in $H_E(S)$ will ordinarily entail an equivalent increase in $H_E(K)$ and $H_E(M)$.

Current "cryptographically secure" PRNGs tend to be deterministic in operation and are equally susceptible to the effects of key and message equivocation, and are thus not information-theoretically secure, since they are "insecure/solvable" beyond a specific length of random output. In order to be truly "cryptographically secure", the entropy or key equivocation lost in a PRNG as a result of random sequence output operations must be replaced at a faster rate than the rate of loss, using probabilistic interactions or injection of entropy—thus allowing "equivocation augmentation" to be extended to random number generators.

It is thus an objective of this invention to extend "equivocation augmentation" to PRNGs, such that any entropy pool used by deterministic random number operations may be subjected to probabilistic random alteration, such alteration resulting in the augmentation of key equivocation of output keystreams at a faster rate than it is lost during operation.

The current "industry-standard" cryptosystem design paradigm relies heavily on the adoption of security standards, and it should be noted that such practices are self-defeating in that they inevitably result in the design of cryptosystems that are ordinarily predictable and deterministic in construction and operation, such that the overall entropy of the cryptosystem is limited to the entropy of key $H(K)$ only. This makes them excellent candidates for equivocation analysis and attack by assailants. For example, the design directives for AES-256 essentially guarantees a unique decryption with English messages longer than 39 bytes (or three blocks of ciphertext), thus making it "insecure/solvable" but "safe" as per the information theoretic definition of security. It is a primary objective of the invention to present a cryptographic design framework which does not favour the assailant in any manner or form, but instead promotes the use of an infinite number of simplistic cryptographic variants. The framework therefore promotes the use of equivocation augmentation through the proliferation of any practice which increases system entropy $H(S)$, including but not limited to random code pages, variable length keys, variable cryptographic operations, polymorphic ciphers.

These and other characteristics of the invention and subject matter under consideration will become evident to those with knowledge of the art of cryptography upon review of the description of the various preferred and other alternative implementation embodiments of the invention described herein.

Practical Implementation of equivocation augmentation Using Various Embodiments

The following descriptions of embodiments, some of which are preferred, are provided for further illustrating, but not limiting, the present invention and subject matter.

We will now provide detailed descriptions of various methods and apparatuses, with reference to the accompanying drawings, which allow for the practical implementation of equivocation augmentation to various example embodiments of the invention. The present invention is based on the underlying core principle that cryptographic equivocation is a cryptosystem characteristic which may be subjected to active manipulation or augmentation, allowing for a framework or approach to cryptographically engineer an unlimited number of variant "secure/unsolvable" cryptosystems. It therefore represents the introduction of an entire new dimension to cryptographic system design and analysis. It should be clearly understood that the scope for the practical application of the principle of equivocation augmentation is largely unlimited, since it can be applied to any technical scenario where loss of entropy (or loss of equivocation once subjected to cryptanalysis) is an undesirable operational trait. Therefore the illustrated and depicted embodiments are only examples intended to explain the principle of the present invention, and are not intended to limit the scope of application of the present invention and subject matter under discussion, and therefore to include any implementation where equivocation augmentation is used for beneficial effect, or where equivocation augmentation is used to substantiate that a specific cryptographic construction has "secure/unsolvable" security characteristics.

To alleviate the cryptographic problems inherent in prior art, various embodiments entailing systems, methods, apparatus and means by which equivocation augmentation may be implemented are described, such as (a) software-based, hardware-based and hybrid software/hardware-based cryptographic secrecy systems that are used to encrypt and decrypt messages in transit and at rest, (b) stateless and stateful random number generators that produce or generate random number sequences, (c) key management systems which store keys, (d) methods which allow for the incorporation of existing "insecure" cryptosystems, effectively endowing any cryptosystem no matter how weak cryptographically with "secure/unsolvable" security characteristics, (e) centralized and distributed key distribution systems, (f) hierarchical and sequential encryption constructs such as blockchains.

A need has been identified for separate systems, methods, apparatus and means of addressing specific cryptographic problems. This includes the need for the integration of some or all of said separate systems, methods apparatus and means in a manner which allows for equivocation augmentation to be effective in pursuing the information-theoretic security objectives.

The primary benefit of the invention and its many embodiments is that equivocation augmentation allows for cryptographic possibilities and characteristics which were previously not available, namely a practical and scientifically verifiable quantum-secure means of encrypting and securing any information using a finite length key, a means of generating truly random numbers in a mathematical manner and a means of endowing any existing cryptosystem with information-theoretic secrecy characteristics. Equivocation augmentation therefore represents an end to the further development of "insecure/solvable" practical cryptographic solutions which rely on assumptions of mathematical complexity since it is generally applicable to any cryptographic primitive or design which uses entropy as a means of ensuring security. The availability of an information theoretically secure communication channel also offers a viable and "secure/unsolvable" security alternative to current "insecure/solvable" public-key infrastructure (PKI) key distribution systems. As a result, users such as governments, military, financial institutions, businesses, or the like may be afforded the highest levels of security and privacy in protecting their digital assets, such as files, data, network communications, in perpetuity. Some embodiments provide benefits such as the ability to perform an almost unlimited number of cryptographic functions, such as unilateral initiation of communication, encryption to local media, encryption over a network, authentication, verification, digital signing, hashing, broadcasting, automated key management, stream auto correction, and others, all using a single cryptographic system. Other features and advantages that are derived from some embodiments will become apparent upon reading this disclosure.

Individual Cryptographic System Components

Certain embodiments of the current invention include, but are not limited to the use of a number of separate components, modules, methods, systems, apparatus and means which may in themselves be considered separate inventions. The separate methods, systems, apparatus or means which will be discussed include: (a) a method of implementing equivocation augmentation in software entailing the encryption of data at rest and data in transit, (b) an apparatus for the implementation of equivocation augmentation as a means of encrypting data at rest and in transit, (c) a method for implementing equivocation augmentation in a hardware device for the purposes of encrypting information in transit or at rest, (d) a method of implementing equivocation augmentation in a computing device for the purposes of encryption/decryption of data at rest and in transit, (e) a method for the implementation of equivocation augmentation in a random number generator for the purposes of generating truly random number sequences, (f) a method for the implementation of equivocation augmentation using any existing cryptosystem or cryptographic primitive, (g) a method or system for the central management and verification of communicating entities (users, machines, keys, algorithms, devices etc.) including the distribution of initial keys or sequences to initialize secure communication links between network nodes, (h) a method or system of exchanging, distributing and protecting initialization keys or sequences between cryptosystem entities.

The cryptographic design rationale behind the example embodiment illustrated in FIG. 4 below (possibly the most basic of embodiments), is best understood if we assume that the cryptosystem has been targeted by a determined assailant equipped with unlimited quantum computing and AI logical deduction capabilities—a QC/AI threat. Security best practice demands that an assumption of insecurity must prevail until such time as a scientific proof of security is clearly and evidently proven or established. We must therefore assume that any computationally complex problem can be solved almost instantly, and that any assumptions made (no matter how improbable) must always favour the assailant.

Unfortunately, Shannon's security (or specifically "secrecy") definition has been eroded over time from an absolute to a relative definition where even "insecure/solvable" systems are deemed to be "secure". We therefore reiterate Shannon's distinction between "secure/unsolvable" secrecy systems and "insecure/solvable" secrecy systems. Our security objective is simple, in that, irrespective of the length of a message, encrypted with a finite length key, producing a ciphertext of infinite length that is intercepted and cryptanalysed by a determined assailant with unlimited time, computing and logical resources, the assailant must always be left with a set of more than 1 possible and probable message following complete cryptanalysis, for any embodiment or cryptosystem to attain the information theoretic security characteristic and therefore be considered "secure/unsolvable".

FIG. 4 is a block diagram of an example of an implementation of an equivocation augmentation process method for the dynamic encryption/decryption of information at rest or in transit. FIG. 4 is in general a block diagram depiction of the basic embodiment of the invention whose equivocation graph was illustrated in FIG. 3. From FIG. 4, we note that the cryptosystem embodiment is relatively simple in construction and composed of the following components: an initial key K 401, an entropy pool KP 402 composed of an active key array KPA 403 and a passive key array KPB 404, a primary encryption array or block B1 405 with 4 characters, two secondary encryption arrays M1 406 and R1 407, a message M 408, a random sequence of infinite length R 409 produced by a random number generator N 410, and an output ciphertext sequence 411.

The encryption mechanics of the embodiment in FIG. 4 may be conducted in sequential encryption cycles where encryption operations are performed on any input streams be they messages, random strings or control information. Encryption cycles may be fixed in composition in a predetermined manner or may be determined and altered randomly between encryption cycles and this variation may be communicated using control information. Whilst the embodiment of the invention as described in FIG. 4 has a limited number of components within a fixed arrangement, the specific composition illustrated has been selected in order to demonstrate the most basic arrangement of the cryptosystem and not to limit its implementation composition. The general design framework of the invention allows for an almost unlimited amount of variation in embodiment composition, including but not limited to the composition (such as quantity, length and range of values used) of the initial key K; the composition of the entropy pools KP; the composition of the entropy pool key arrays; the composition of the primary and secondary encryption arrays; the type and number of encryption/decryption operations used; the order of encryption/decryption operations; the number of message streams, random streams and control streams; and the specific order in which input stream and output stream values are arranged or processed.

However, the invention may be easily distinguished from other cryptosystems in that, (a) a sequence of random values may have its values encrypted or transformed using an encryption or mathematical process, (b) the encrypted values may be joined with any messages to be secured in a composite message sequence of values, (c) the values and the locations of said values of the composite message sequence may be transformed into ciphertext using an encryption or mathematical process which allows for the augmentation of message equivocation (requires a transposition), (d) the ciphertext may be stored or transmitted, (e) after every encryption cycle the random values will be used to transform the existing key or the values of an existing entropy pool, using an encryption or mathematical process which will allow for the augmentation of the key equivocation of the system in a manner which increases the number of keys available in the next encryption cycle, (f) the process is repeated for every encryption cycle until all messages have been secured, (g) following encryption, the current key or system state may be stored for later retrieval.

In the case of decryption, (a) from an initial synchronised key and system composition state, within each encryption cycle, the encryption operations and sequence may be performed in a manner (may entail a reversal of the sequence of operations used in encryption) which allows for the random sequence and other messages to be extracted from the ciphertext (b) prior to the decryption of the next encryption cycle, the random sequence is applied and used in an identical manner, which will allow for a synchronicity of keys and system composition between sender and receiver to be established, and thus allow for the correct decryption of the ciphertext produced by the next encryption cycle, (c) this process is repeated until the entire message has been extracted, (d) following decryption, the current key or system state composition may be stored for later retrieval.

The decryption process effectively entails a reverse process of the encryption operations used, resulting in the message M and the random string R being produced as outputs. The application of R to the key (or its source entropy pool), will synchronise sender and receiver encryption keys, and thus allow the next operation to proceed.

The key and message equivocation augmentation method starts at the initial secret key K 401 which may be of variable length and composition and may be generated by one of the encryption and decryption entities. Key K may then be distributed or shared between the communication entities (sender and receiver when securing information in transit) using a secure communication channel, or may be retrieved from a storage key repository which allows inter-encryption states to be maintained by any communicating party between encryption operations. For data at rest, a party may generate his own encryption key, or for decryption, he may retrieve the required key from his designated key storage repository. With data at rest, the same entity performs encryption and decryption operations, and key distribution is not required.

The initial key of the cryptosystem, need not be a key of any definite finite length. Indeed, it is cryptographically wrong to do so, since it presents the assailant with a clear boundary of the cryptographic problem to be solved. Removing knowledge of the length of key being used, forces the assailant to pursue possibilities which do not exist, and thus increases the effective equivocation of the problem to be solved, since the assailant must cover all possibilities, and thereby, this allows for an artificial increase in message equivocation. For example, even if the assailant knows that the maximum key size is 12 characters, using a key of 10 characters, will ensure that the assailant has to evaluate a message space $2^{16}$ larger than is necessary, increasing the conditional entropy of probable messages by $2^{16}$. Whilst this may not be considerable from our assailant's perspective, it increases the efficiency of the equivocation augmentation process considerably. Thus, whilst a 12 character key is used (128 bits) in the demonstrated embodiment in FIG. 4, there is no specific key length requirement, since an unknown length of key may be appropriately truncated to the desired length, or appended sequentially (with an optional mathematical operation, such as linear modular addition) to the desired length.

Let us assume that an initial key K of 10 characters (120 bits) was distributed or made available to the parties and that the current embodiment does not use an optional key management module. A simple solution is to append the first two key characters K[1] and K[2] and append them to the end of the key. Ordinarily, keys may be of any length, beyond 1024 bytes, although this is not necessary, yet the threat of keys that long must be presented to the assailant. This initial key set of 12 bytes may be used to transmit a key/composition message which defines the key and the composition to be used for the encryption. There are an infinite number of ways to do so, but determining the new key and composition in a predetermined manner from a random sequence and transmitting {primary block length; secondary block length; other block length; break; key $K_1$ to $K_n$} immediately followed by the ciphertext encryption of the message is sufficient. The ciphertext could equally be appended with an entropy sequence to alter the original saved state key. All encryption occurs behind at least two XORs and a transposition, since no entropy of the second key is lost, even if the message is known.

The security of the embodiment is anchored or started at the point where an initial key K is generated by one of the participating parties. The key generation process may occur in a predetermined manner upon request by the receiver, or occur randomly upon instruction.

In order to perform encryption or decryption, a synchronicity of key and system states or composition is required between encryption cycles. The initialisation of the embodiment of the invention entails two initialisation procedures or steps 412 and 413. Step 412 entails a process whereby certain predetermined values of K (in our example, K[0] and K[1]) are used to populate elements of the key array K3 414 (in our case, K3[0] and K3[1]). K3 will remain an independent key throughout the operation of the embodiment and will not be subjected to any equivocation augmentation process. Specifically, K3 will be solely used to encrypt all elements of random string R 409, within the secondary encryption (R1) array 407, and in our embodiment the random string characters R[0] and R[i] will be encrypted with an XOR operation 415 to produce CR[0] and CR[1] 416. Naturally, the K3 key array must be at least as large as the secondary encryption array (R1) to prevent K3 key reuse within the same encryption cycle. Step 413 entails the initialisation of the entropy pool KP 402 whereby specific predetermined or selected values of key K (in our case, K[2] . . . K[n]) may be extracted in a predetermined manner and used to populate the "active" entropy pool array KPA 403 (in our case, KPA[0] . . . KPA[n]). The length of KPA may be variable, and may be predetermined or altered dynamically between encryption cycles. Where the selected K initialisation sequence (KI) of values is shorter than the array length of KPA, KI may be repeatedly applied until the KPA array is fully populated. Any "overflow" in the KPA array buffer due to a repetition of KI or where KI is longer than KPA, may be used to populate the "passive" entropy pool KPB 404. Like KPA, KPB may be variable in length and need not be of a similar size to KPA. The entropy pool KP may include any number of additional "active" or "passive" entropy pool arrays 418 or there may be multiple such entropy pools. Following initialisation, K3 and KPA will be fully populated, and KPB will be partially populated. An additional initialisation procedure may be adopted whereby the message M may be a random message sent purely for the purposes of augmenting KPA until KPB is fully populated. Naturally, our assailant is unaware of the lengths of the components K, K3, KP, KPA and KPB. In addition, the first encrypted message M transmission may include a random string which is used to subsequently determine the composition of K3, KP, KPA and KPB in a random manner. Alternatively, these instructions could be sent as control information in a channel provided specifically for this purpose.

Whilst not required to preserve the "security guarantee", a key of unknown length may be used, in a repetitive manner {K1, K2, K3, K4, K1, K2, K3, K4 . . . } for a predetermined length, and used in a cyclic manner. This will ensure that the assailant will have to try a number of varying key lengths, not just key values of those lengths, resulting in an increase in the overall equivocation of key and message for the captured ciphertext, such increase being the logarithm of the total number of cryptographic variations to be solved. In addition, variations in cryptographic structure may be introduced in a predetermined manner or altered between encryption cycles, such that the composition of the cryptosystem may be dynamically morphic and different with every encryption cycle. Additionally, a key of unknown length may be split into two separate keys, and extended. Thus, the random stream may be used to determine or alter any characteristic of the cryptosystem (key lengths, key values, seed values, entropy pools, message bytes, random bytes, variables, encryption operations, tables, etc.) in an infinite number of ways, not just to augment the equivocation of key and message, but also the equivocation of system composition.

Following an initialisation, the independent key K3 414 will have been populated, and one of the entropy pool arrays (either KPA, KPB or other) will be fully populated and be designated as "active". At least one entropy pool array will be designated "active", and another designated "passive", at any point in time. The "active" designation will pass to the latest entropy pool array that has been fully populated. Upon redesignation, the currently "active" entropy pool array will be assigned a "passive" designation, and will have its array contents cleared or deleted 419, or recycled and reused 420 elsewhere as an entropy source in itself. Alternatively, the entropy pool arrays may be constructed as cyclic queues or tables. The importance of the "active" designation of an entropy pool array is primarily due to two reasons: (a) the array being "actively" designated as the source of any required encryption keys, and (b) the array is the "actively" designated array for key equivocation operations.

In our embodiment, we see that key values are derived from specific KPA values such that KPA[1] and KPA[2] determine the composition of key K4 421 used to encrypt the message sequence M[0, 1] in the secondary encryption array M1 406 with an XOR operation 422 to produce the ciphertext sequence CM[0, 1] 423. Note that the encryption of the message M using K4 was excluded from the equivocation graph depicted in FIG. 3 and constitutes an additional security contribution. In a similar manner, KPA[4, 5, 6, 7] designates the value of key K1[0, 1, 2, 3] 424, whilst KPA[8, 9, 10, 11] designates the value of key K2[0, 1, 2, 3] 425. The specific designated values or locations may be predetermined or randomly altered with every encryption cycle using control information messages 431. Note that 431 may be of any length, but was not included in the primary encryption block encryption operations using K1 and K2, in order to keep the demonstration of this embodiment as simple as possible. Where this is required, K1 and K2 would have to be increased in length accordingly, and this may require an increment in length in KPA, or the use of multiple entropy pool arrays, or alternatively one may use a combination of entropy pool array values (such as XORing or transforming 2 or more values to produce a key value).

Key K1 is used to apply an XOR encryption 426 on a composite message/random ciphertext sequence (entailing CM[0, 1] and CR[0, 1]) 427 to produce ciphertext sequence CX[0, 1, 2, 3] 429, and key K2 is used to subsequently apply a transposition of fixed period 4 transformation 428 on ciphertext sequence CX[0, 1, 2, 3], to produce ciphertext sequence C[0, 1, 2, 3] 411, which is subsequently added to the output buffer and transmitted or saved locally if the operation is an encryption of data at rest. Additional keys and cipher types may be added to the secondary or main encryption blocks, and their sequence may be altered. Naturally, any decryption operations would have to be synchronised accordingly.

In the primary encryption block, every input character encrypted by the XOR secondary encryption blocks should be subjected to an encryption process which impacts both the value and location of that character. Any combination of ciphers or transpositions may be used for this purpose, but an XOR and a transposition of fixed period is sufficient. Additional encryption transformations may be used, but this is not desirable, since additional complexity ordinarily results in reduced performance. Additional encryption ciphers may also be used or added to the XOR secondary encryption blocks, with the result that such ciphers will benefit from the "secure/unsolvable" protection of the whole embodiment. From a transmission perspective, any ciphertext produced by the invention may be appended to any existing ciphertext in a buffer, before being re-encrypted, or before being transmitted to the receiving entity.

In some embodiments, control information values may be used between encryption cycles for multiple purposes, including the specification of the length of the composite message sequence in the primary encryption block, including the message, random and control contributions. Note that in another embodiment the encryption block sizes need not be fixed but may be altered in length in a predetermined or randomly determined manner. Yet in another embodiment control messages may be used for message or user authentication, or to transmit asymmetric keys. They may also be sent as cleartext, or encrypted in the primary encryption block, or may be pre-encrypted using an independent encryption sequence as is required for message authentication codes.

Most importantly, in every embodiment, after every encryption cycle, the R random values, in our example R[0, 1] 432, are used to alter the values in the "active" entropy pool array using a mathematical operation 433 which allows for all possible combinations in key K output (thus augmenting key equivocation). Note that the current R values need not be applied immediately and sequentially, but some R values must be applied after every encryption cycle. A simple example of such an operation, and there are many, is where the current values of KPA[0, 1, 2, . . . , n] are multiplied by the R[0, 1] values, resulting in a product having length KPA[n+2]. The values of KPA[0] and KPA[n+2] may then be used to populate two array elements or locations of any other KP "passive" entropy arrays with every encryption cycle, until those entropy pool arrays overflow, triggering an "active" changeover between entropy pool arrays. Following the mathematical operation denoted above, the remaining KPA array locations may be rotated in a cyclic manner, or their location may be moved down by one place, such that KPA[1, . . . , n+1] is moved to KPA[0, . . . , n]. If at any time a passive array is fully populated, it becomes active, and the existing values of the previously active array may be retired immediately or after a certain number of encryption cycles. The mathematical operation 433 may extend over multiple entropy pool arrays, or multiple mathematical operations may be applied on a single entropy pool array, or a combination of both possibilities may be used. Note that in some embodiments the entropy pools may be implemented as various alternative structures capable of holding random values and allowing mathematical operations to be performed on them, such structures including but not limited to entropy tables, entropy queues, cyclic queues, It is a specific objective of the invention, that the entropy of existing keys must be augmented and not replaced with new key entropy. The reseeding of keys is an expensive and ineffective mechanism and is only necessary in cases where a system has no information theoretic security. Entropy and thus equivocation augmentation is easy to conceive. Equivocation is merely the logarithmic representation of the viable keys or messages which remain after all possibilities have been considered. Assume a 16-bit key being applied to a plaintext message character and a random message character. After cryptanalysis, $2^{16}$ key possibilities (65536) will have been reduced to $2^{9.3}$ ($2^{1.3}*2^8$)=630 key and message possibilities, composed of at most 2.4 message characters with 256 possible random characters. In one embodiment of the invention, the random message, in this case the $2^8$ key (256 possibilities) may be used to augment the reduced key possibilities for the next encryption, by subtracting one bit from the old key value if it is even, and adding a top bit if it is odd, and multiplying the result with the new key value. The result is $2^{17.3}$ (161368) viable calculated results, or 2.4 times the keys required. Thus even if the 630 keys were specifically known and tabled, by applying a test for oddity, and a multiplication mod 65536, using both keys as inputs, prevents an assailant from determining the exact values of the new or old key. This is so even when the key is a single unique valid key/message as is the case with a known plaintext. And this is the nature of the mathematical operation applied in step 360 to augment the equivocation of the system key K, of our example in FIG. 3. The 120-bit key is incremented by 1 if even, and made odd, and multiplied with the values of R1 and R2. The operation contemplated in step 361, in that the equivocation augmentation principle may be applied to random number generators, may be performed by adding all the values of the new key and sending them as a total to be applied to the random number generator N, using a similar procedure.

In an alternative embodiment of the invention, the key equivocation augmentation process may be performed through XOR encryption of the existing key with the new key values, and applying a linear addition operation over the values of the new key. There are a number of ways that one may take two values and ensure that all possible values may again be available after the operation, namely that the equivocation of key may be augmented to an originally high value. In another embodiment of the invention, any residual entropy which remains after the equivocation augmentation process may be set aside in an entropy pool, in order to build a completely new key. Yet in another embodiment of the invention, the existing key may be a section of a cyclic key, and following the equivocation operation, the key is merely expanded within the cyclic key by the new values.

Certain embodiments of the current invention include, but are not limited to the use of a combination of encryption ciphers or algorithms which occur in a hierarchical manner such that encryption may be performed at various primary, secondary, tertiary etc, hierarchy levels. Each encryption hierarchy level may entail multiple encryption operations on the same inputs, or multiple independent encryption operations on separate inputs. The inputs to each encryption level may be composed of one or more message streams or messages, one or more random streams or strings, control information, or other cryptographic components or primitives such as keys, digital signatures, hashes, message authentication codes, error correction codes, or variables used to alter the mechanics of the cryptosystem. Inputs may also naturally include the ciphertext outputs from previous encryption levels or independent cryptosystems. The underlying principle to the present invention and subject matter being that randomly generated strings are inserted at lower encryption levels, are mixed and encrypted with messages, and subsequently used to augment or restore any lost key equivocation in the previous cycle.

Since the invention promotes the use of keys of unlimited and variable length, it should be noted that in order for equivocation augmentation to be effective, a specific technique is required with regards to the initialisation and augmentation of keys when using a key entropy state, table, pool, array or structure of specific design. In some embodiments, this key entropy pool may be replaced with one or more stateful random number generators of specific design, composed of one or more internal states, and capable of allowing its internal states, variables or outputs to be dynamically altered during normal operation.

The hierarchical structure of the invention framework, allows for an infinite number of encryption levels, each supported by a K sub-key. In some embodiments, any number of keys from alternative sources may be used, such that key K4 for example may be provided independently by a certifying authority, or provided in two or more parts from independent key sources. In some embodiments, it may be possible for multiple independent parties to encrypt and secure entries in a blockchain in a "secure/unsolvable" manner using a sequence of infinite encryption levels of similar construction to a primary encryption level (using an XOR and a transposition). The ability to leverage multiple keys at a single encryption level is seen with key K1 and K2, thus any entry in a blockchain may be encrypted by two separate parties, or may be encrypted using an encryption and an authentication key. Alternatively, in some embodiments, keys, authentication codes or other cryptographically relevant information may be used as key K, (or its sub-keys), as the random string, or as part of the message.

In some embodiments of the invention, provided the primary encryption level, the random inputs, and the associated K keys (and thus the entropy pools) are large enough, any number of secondary encryptions, supporting any number of multiple or multiplexed communication channels may be implemented. In addition, with reference to secondary encryption block M1 406, in some embodiments this encryption step may be performed separately using any existing cryptosystem or cipher and its outputs processed by the primary encryption block B1 405. This allows for a practical means of implementation which allows any existing "insecure/solvable" systems to be secured within the "secure/unsolvable" invention framework. However, this will be inefficient, since an XOR is sufficient for this purpose. Alternatively, in some embodiments M1 406 or a specifically designated secondary encryption block may be used as a "secure/unsolvable" channel to transmit any additional authentication and encryption keys or information. In any embodiment, a control information secondary encryption level or block may be used to transfer message authentication, message validation, user authentication, digital signatures, error correction and error detection information provided that the keys to such an encryption block are managed independently (non-independence guarantees an increase in equivocation loss). Thus, the invention allows for authenticated encryption using control blocks.

For example in some embodiments encryption inputs may entail the plaintext message M, the random message R, the key K (including independent sub-keys used to encrypt R), an optional plaintext header H covered by authentication protection, and a control block CTL containing the authentication tag or message authentication code MAC, resulting in the ciphertext C. Alternatively, the control block CTL may include the message header H, and the output may include the MAC. The CTL block must be independently encrypted (to prevent collisions) at the secondary encryption level as is denoted by the CTL[0] 431 array element within the primary encryption block 405 shown in FIG. 4. Note that the CTL block may be of any size, and the keys K must never be reused within any encryption. Decryption will entail using the ciphertext C, the keyset K, the authentication MAC and optionally a header with outputs being the message M, the random message R or an error if the authentication MAC does not correlate with the header H or the ciphertext C. Additionally, in some embodiments, any existing cryptographic construct or primitive may be protected in a "secure/insolvable" manner merely by transmitting the plaintext information, or the ciphertext as a message M 408 input (although MACs must still be independently encrypted)

In all embodiments of the invention, a pseudo-random number generator (PRNG) N 410 is used to produce the required random sequences R 409 which are essential to the proper functioning of any embodiment. Extreme care should always be taken with N, in that it should be independent from the message stream, and whilst existing PRNGs may be used, there is a problem that must first be resolved. It is in general difficult, if not impossible, to produce truly random sequences of numbers using a single PRNG of deterministic mechanics without some form of probabilistic random intervention. It is this probabilistic random intervention which separates true-random from pseudo-random number generators (PRNGs). PRNGs are equally subject to entropy decay, or seed key equivocation loss, and therefore without some form of key equivocation augmentation, as contemplated by the invention, their key equivocation $H_E(K)$ is guaranteed to hit unity (loge 1=0) at some point in their random output with respect to the encryption of message. Note that we must assume that our assailant will attempt all possible variations of the seed key inputs of any PRNG, and eliminate seed keys which do not produce valid decryptions. In a search, when a "positive" valid sequence is found it will be pursued until it exceeds the "unicity point". Any valid decryption longer than the "unicity point" ends the search prematurely, since it is in great probability the only valid decrypted message and key, and the encipherment will be rendered "insecure/solvable".

Certain embodiments of the invention allow for PRNGs may be made "secure/unsolvable", by periodically augmenting any lost seed key equivocation in the PRNG. Note that reseeding a PRNG will only alter its output key equivocation if the seed key has been distributed using an independently secure channel. From FIG. 4 it should be noted that the entropy pool used, namely KP 418, satisfies the criteria for a PRNG with "secure/insolvable" security characteristics, since it's key equivocation is augmented with every encryption cycle. In addition, the encryption component of the embodiment (specifically the encryption inputs, keys and outputs) may be seen as a different type of "secure/unsolvable" PRNG. With the entropy pool, the PRNG mechanics entail the application of a mathematical operation on the active array KPA 403 using the random string R 432, producing a random sequence K1 424, K2 425 and optionally K4 421, and periodically, an additional entropy output 420. In the case of the invention itself, inputs K1 424, K2 425, K3 414 and optionally K4 421 are used to encrypt another set of inputs M and R to produce ciphertext C 411. In both cases an existing set of values is operated on by another random set of values producing an output random sequence whilst augmenting the key equivocation of the PRNG. In some embodiments, PRNG N 410 may be constructed as one of such "secure/unsolvable" PRNGs, or may use an existing random number generator.

In some embodiments, the random message R may be used to reseed the PRNG, but such solutions are inefficient due to additional operations required for reseeding, and have a reduced loss of residual entropy, and require greater lengths in random messages to maintain equivocation augmentation at a sufficiently fast rate.

In some embodiments of the invention, initial keys K 401 or sections of K(separate sections may be distributed independently) may be generated by one communication entity and distributed directly to the other communication entity either directly or indirectly through one or more third parties. Distribution may entail the distribution of the entire initial key K 401 or its constituent parts. In some embodiments, where a sender Tx and a receiver Rx both have an existing authenticated "secure/unsolvable" connection to a third party Sx (need not be trusted), the sender A may use the "secure/unsolvable" channel for both user authentication and distribution of keys, or may use the channel for only one of such operations. Some embodiments entail authenticated encryption whereby existing0020authentication keys and encryption keys may be simultaneously applied as key K4, as prevent unauthorized access by communicating parties by enforcing authenticated encryption such that authentication keys and encryption keys may be simultaneously applied to various components of the invention.

A fundamental advantage of the invention in all embodiments, is that it allows for the "secure/unsolvable" encryption of data at rest and in transit. This capability may be extended to the local "secure/unsolvable" storage of encryption or authentication keys. Ordinarily, if one encrypts a larger key (in other words larger random message) with a shorter key, or vice versa, and one of the quantities are known to the assailant, the equivocation of the encryption is limited to that of the smaller key or "random message". In other words, encrypting a 256-bit key (as a message) with a 40-bit key only allows for $2^{40}$ variations of random strings or keys with 256 bits. In some embodiments, this limitation is overcome by using encryption keys of variable length (hides message equivocation), encrypting stored keys using fixed lengths such as (512 bits) and adding random padding where they are short, and by dynamically increasing the encryption keys and block sizes with every encryption operation. Thus, it is possible to encrypt a 256 bit "saved" key as a 512-bit ciphertext (or any key of any length may be saved to a ciphertext of about twice its size) using a smaller encryption key of 40 bits and lose no entropy in the 256-bit "saved" key. In some embodiments, a separate encryption component is used to securely store any current session keys K 401 of a specific communication link when not in use, or as a means of recovery in event of communication failure. Several "instances" of communication states may also be kept in case of failure. Failed transmissions may be recovered by transmitting a reconnection packet using one saved communication state to instantiate another saved state with a random amendment.

Some embodiments of the invention may entail the generation, "secure/unsolvable" transmission and "secure/unsolvable" storage of "one-time pads", very long keys or ephemeral "one-time use", which may be pre-stored and retrieved when required.

In some embodiments, the session keys which allow for secure communication need not be determined by any of the communicating parties, but by a key management service which authenticates user access to the protocol and instantiates secure connections when required, preventing users from directly accessing the mechanics of the encryption protocol.

Some embodiments of the invention may entail encoding of messages prior to their encryption by the invention. Since message equivocation is dependent on message character sequencing, predictable message headers and suffixes present a security risk. In some embodiments, this risk may be mitigated by the pre-encryption or pre-encoding of the message using another cryptosystem, or applying a transposition over the whole message using a key, or by applying a transposition over each section of the message and then transposing the message sections. Placing the keys at the end of messages forces entire message sequences to be analysed, increasing "safety" but not the "security" of the message. In some embodiments, compression may be used to reduce message redundancy, if compression headers are eliminated (since they are predictable). In other embodiments predictable standard code pages (such as UTF-8) may be randomized in a predictable or predetermined manner.

Certain embodiments of the current invention include, but are not limited to the implementation of equivocation augmentation in a block cipher suitable for application in encryption/decryption hardware and software devices. In this manner, the present technology may support custom implementation of encryption and decryption, for example by supporting a dedicated hardware-based implementation.

FIG. 5. is a block diagram of an implementation of equivocation augmentation as an encryption 500 and decryption 520 block cipher. The encryption embodiment demonstrated is composed of the following components: an input array comprised of plaintext and random sequences of blocks 501, said random sequence of blocks being produced by a random number generator; a shared secret key KA 502; an entropy pool 503; and an output array of 8 blocks of ciphertext 504. The decryption embodiment is composed of identical key K 502 and entropy pool 523 components and composition, and effectively performs all encryption operations in reverse, transforming a fixed length ciphertext input 521 into fixed length plaintext and random output sequences 522, composed of a plaintext and random sequence of blocks.

The cipher mechanics are essentially similar to that described in FIG. 4 previously, with the understanding that that block ciphers ordinarily require input and output arrays of equal and fixed length, and entropy pool arrays (each entropy pool has at least two) are also fixed, In our case, entropy pool arrays may be of 16-bytes in length. The cipher entropy pools may be synchronously initialised in the pre-described manner by the sender and receiver, by fully populating their respective entropy pool arrays (of predetermined or randomly determined length) with the key K of unknown length and values, repeating the key if necessary. After initialisation, the required number of K sub-keys (in our case K1, K2, K3 and K4) are extracted from the pool in a predetermined or random manner from identical locations in the entropy pool arrays, and allocated to a predetermined encryption/decryption operation. Optionally, the entropy pools may be replaced by random number generators of specific design capable of accepting random alterations to their deterministic mechanics, and the keys may be derived from their random outputs. Each separate K sub-key must be at least as long as the allocated blocks where it will be used in an individual encryption/decryption operation, such operations entailing for example K4 being used to XOR transform the random sequence of blocks, K3 used to XOR transform the plaintext blocks, and K2 and K1 used to transform the resultant 8 blocks of joined ciphertext from the previous operations with an XOR and a fixed period transposition.

Following each encryption or decryption operation, the identical random sequence of blocks transmitted by the sender and received by the receiver are used to alter the values of their respective entropy pool arrays using a mathematical operation 505 and 524. New K sub-key values are then extracted from the entropy pool in a predetermined manner (may be similar to the initial extraction, or may be altered randomly), and applied against the next block cipher inputs. Note that K4 (the key used to encrypt and decrypt the random strings) is kept independent and only derived once, although it may be altered using an additional "secure/unsolvable" communication channel if one is available.

Whilst the encryption fixed length 8-byte input array or block 501, is composed of four plaintext and four random block sequences, it may be composed of any variation or number of plaintext, random and other sequences provided that such a composition complies with any implementation requirements. In addition, the values of the blocks may be varied from 8-bit values to any other bit-length. The input array 501 may accommodate multiple plaintext and random block sequences. In addition, it is possible to perform parallel operations, by performing encryption/decryption operations on separate sections of the plaintext. Note that the random number generator described previously does not suffer from entropy-depletion. Naturally, dynamic variations with regards to plaintext or random message pre-encoding mentioned in FIG. 4 above applicable to software-based implementations may be accommodated by hardware implementations.

Certain embodiments of the current invention include, but are not limited to the implementation of equivocation augmentation in an apparatus.

FIG. 6. is a block diagram of an implementation of the invention of equivocation augmentation in an encryption apparatus (600) and a decryption apparatus (700) for the purposes of securing information in transit or at rest. In FIG. 6, the encryption apparatus (600) is composed of a random number or key generation module 601, a key management module (602), an entropy pool or key synchronisation module (603), an encryption module (604), a message input module (605) and a communications input/output module (606).

The decryption apparatus (700) is almost identical in composition (with the exception of the random number or key generation module 701), but with components operating in reverse order, such that it has a key management module (702), an entropy pool or key synchronisation module (703), a decryption module (704), a message output module (705) and a communications input/output module (706). The Key Management component 602/702 is primarily used for secure storage and management of keys between encryption sessions (for data in transit and at rest), and is optional in both apparatus.

The encryption/decryption procedures of any apparatus may be divided into two separate security objectives, namely the provision and maintenance of the primary task of encryption and decryption, and the provision of a secondary security task which prevents direct access to encryption mechanics and entails the additional key storage and user management activities. The encryption process starts with the arrival of the message M at the Message Input module 605, in step 607. The Message Input module then transfers message blocks in requested lengths 608 to the Encryption module 604. The RNG module 601 is used with every encryption cycle to generate the encryption random message blocks sending them to the Encryption module in step 609 and to the Entropy Pool in step 610 for equivocation (conditional entropy) augmentation purposes. Ordinarily, upon receiving a message in the Message Input module, the Entropy Pool is populated with the initial key K, which allows for sub-keys K1, K2, K3, K4 611 to be sent to the Encryption module for encryption operations. In subsequent K sub-key transfers, K4 (or any key used to encrypt random sequences) is excluded from having its key equivocation augmented. Encrypted message blocks are then passed to the Communication Input/Output module 406, which may buffer them before transmission to, or storage at the designated destination in step 613, and clears the buffer when acknowledgments are received.

The decryption apparatus 700 process is effectively a reversal of the encryption activities performed in the encryption apparatus. A ciphertext is received by the Communication Input/Output module 706 in step 713 and passed to the Decryption module 704 in step 712. Likewise, the Entropy Pool module 703 is synchronously initialised in an identical manner to the sender's entropy pool, such that identical K sub-keys as sent to the Encryption module are sent to the Decryption module in step 711. The decryption process effectively results in message M being sent to the Message Output module 705 in step 708, and the random sequences R are sent to the Entropy Pool in step 710 for equivocation augmentation operations. The message M is subsequently exported from the Message Output module 705 in step 707 to its final destination.

The Key Management components in encryption and decryption apparatuses are primarily used for key storage, connection management between communication sessions (for data in transit and at rest), restoration of failed communication states, and may be optional if direct key access is required. The Key Management modules 602 and 702 allow for the operation of the invention without the direct intervention of the sender or the receiver, by keeping user authentication separated from node authentication or encryption. Ordinarily, following a successful encryption and decryption, the current state of the Entropy Pool modules are saved by the Key Manager using steps 614 and 714, and upon subsequent communication requests, the saved states (saved in a "secure/unsolvable" manner by the Key Manager) are restored back to the Entropy Pool. The use of a "secure/unsolvable" encryption protocol makes the constant renewal of session keys redundant. Alternatively, the key management module may store the keys externally using the communication input/output module 606 or 706 for retrieval later. Alternatively, more than one key state may be stored for a specific remote location, one for transmission and another for reception of encrypted communications. This also provides for some element of redundancy with regards to key errors.

From an encryption key management perspective, the arrival of a message at the Message Input module is usually accompanied by a source authenticator and destination and this information may be reported to the Key Manager using step 615. If a saved Entropy Pool state is not found for an existing communication connection, a new communication connection may be initiated in that the RNG may be used for the creation of initial K keys which are stored by the Key Manager in step 616, and subsequently communicated to the receiver by steps 617 and 618. The RNG module 401 may be seeded through the message input module 405, or through a predetermined characteristic of the apparatus, such as time or contents in other modules. If an existing Entropy Pool connection state is found, it is restored to the Entropy Pool using step 614. Encryption ciphertexts may be started between sender and receiver using an initial encrypted synchronisation package. From a receiver's perspective, a request for a new connection (new or existing Entropy Pool state) may be received using step 718 by the Communication Input/Output module and sent to the Key Manager module using step 717. The Key Manager may then verify that an existing Entropy Pool state or initial K keys are stored locally, and ensure that access permissions are valid with step 715 to the Message Output module. Note that such Key Manager to Key Manager connections may be limited to "secure/insolvable" authenticated connections using an alternative communication channel. In the case of where a new connection is established, the initial key K is transferred between Key Managers, who subsequently negotiate the communication between sender and receiver and manage all required entropy pool management procedures.

The key management module 602 is primarily responsible for maintaining the keys (specifically, their current state) which relate to specific receiving destinations, and may also receive acknowledgements of key receipt sent by the receivers through the communication input/output module 606. Key distribution may occur over a secure channel, or may be distributed using manual or other means. When distributed manually, the key and receiver ID may be inserted using the message input module 605. The communication input/output module will ordinarily send encrypted data over a public network, or may store the data locally for secure storage.

Both decryption and encryption apparatuses may be combined into a single apparatus which may perform multiple encryptions and decryptions simultaneously. For this to occur, it is required that there be as many encryption/decryption modules as the maximum number of secure communication streams which need to be serviced. Since encryption modules and decryption modules are virtually identical in composition with each one serviced by a key synchronisation module, it merely requires that several such instances be available. Note that additional buffers may be required for input/output modules and message input and message output modules to handle the increase in traffic due to multiplexed communication streams. In addition, decryption modules may forward random entropy updates to the internal RNG after the key synchronisation modules have had their keys updated, as is shown with steps 619 and 719, and thus alter the deterministic mechanics of RNGs with regards to their outputs. Taken from a network perspective, this effectively amounts to a neural network of equivocation augmentation such that the entropy transmitted by a single machine will ultimately affect all machines—mass chaos distribution.

FIG. 7 is a structural block diagram of a computing device suitable for use in implementing the equivocation augmentation process as a means of securing information through encryption and decryption, whether the information or the encrypted form of such information be in transit or at rest. The computer device or system as shown in FIG. 7 is composed of a Central Processing Unit (CPU) 801, a Read Only Memory (ROM) component 802, and a Randomly Accessible Memory component (RAM) 803, all connected to a System Bus 804. Attached to the System Bus is a Network Controller 805, a Disk Controller 806, a Graphics Controller 807, an Input Peripheral Controller, an Input/Output Interface Controller 809, and a USB Controller 810. Network adapters 811 are connected to the Network Controller, Hard Disks 812 and Optical Disks 813 are connected to the Hard Disk Controller, Display Devices 814 are connected to the Graphics Controller, Keyboards 815 and Point Devices 816 are connected to the Input Peripheral Controller, Parallel 817 and Serial External Devices 818 are connected to the Input/Output Interfaces Controller, and a wide variety of USB Devices 819 are connected to the USB Controller.

It should be understood that the block diagrams in FIGS. 4, 5, 6, and 7 as demonstrated are shown for illustrative purposes only, and are not intended to limit the scope or implementation of the invention in any manner or form. In some embodiments, some devices or components referred to may be added, removed, split or joined as required.

The present invention relates to and discloses methods, apparatuses and implementations for the "secure/unsolvable" dynamic encryption and decryption of information using equivocation augmentation, therefore allowing for the practical implementation of a unique security characteristic, in that a secrecy system may be engineered to be information theoretically secure, absolutely secure, by ensuring that any brute-force decryption attempt by an assailant equipped with unlimited computational and time resources, will always result in multiple viable messages being produced. The cryptographic solution presented in this disclosure according to the present invention has excellent security, memory footprint, and performance characteristics, is highly extensible with regards to key and cryptographic mechanics and may be implemented in, incorporated with or used by any number of existing or future cryptosystems. The present invention and technology provides for an engineering approach whereby a random entropy sequence can be transmitted along with messages and used to replenish the entropy lost during the encryption process, thus effectively ensuring that an information theoretic security condition can be maintained in perpetuity, whilst only initiating the process with a key of finite length. This is an improvement on existing encryption technology, since this has been impossible to achieve previously. In addition, the invention is effectively a cryptographic design framework which allows for an almost infinite number of implementations variants, in software, hardware and hybrid configurations.

In particular, according to some embodiments of the present invention, a technical solution of the present invention may be implemented with a known "insecure/solvable" secrecy system, thereby increasing its security profile to that of an "information-theoretically secure" system. The present technology allows encryption and decryption to be implemented with less management and processing resources.

More specific examples (a non-comprehensive list) of secrecy systems or cryptographic components which may be cryptographically enhanced using equivocation augmentation may include, but are not limited to, block ciphers, hashes, random number generators, pseudo-random number generators, symmetric encryption systems, asymmetric encryption systems, Diffie-Hellman systems, Feistel networks, block-chains, one-way functions, elliptic curve functions, quantum cryptography systems, RC4, AES-256, message authentication functions, digital signatures, one-time pads, XORs, fixed period transposition ciphers, substitution ciphers, Vigenere ciphers, Caesar ciphers, ROT13, Beaufort ciphers, reverse Beaufort ciphers, compound Vigenere ciphers, diagram substitution ciphers, trigram substitution ciphers, n-gram substitution ciphers, Vernam ciphers, Single mixed alphabet Vigenere ciphers, fractional ciphers, matrix systems, codes, Giverge ciphers, Playfair ciphers, Multiple mixed alphabet Substitution ciphers, Autokey ciphers, cryptographic ciphers using prime numbers, ciphers based on mathematical complexity, lattices, homomorphic ciphers, polymorphic ciphers, lattice systems, matrixes, authentication schemes, modular addition ciphers, multiple secrecy systems, hierarchical secrecy systems, multi-factor authentication systems, pure ciphers, open secrecy systems, closed secrecy systems, message compression, message expansion, multiplexed secrecy systems, or any suitable combination of the foregoing. The list includes any cryptographic system or cipher, which may benefit from an entropy or equivocation augmentation solution as a means of assuring information theoretic security.

As may be appreciated by one skilled in the art of cryptographic design, various individual and combined aspects of the present invention may be embodied as a system, apparatus, method or computer program. In addition, the various embodiments of the present invention and subject matter may be implemented in software, hardware, or a hybrid combination thereof. Software aspects and variants may store logical instructions, sequences or commands on a storage medium (such as memory) and such logical structures may be executed using a microprocessor or other instruction execution system, or purposefully designed hardware. Hardware implementations may be executed using transistor assemblies or other components capable of instruction execution and logic.

Further, various aspects of the present invention and subject matter may take the form of a computer program product embodiment using any number of computer readable medium(s) with computer readable program code thereon. Embodiments may be composed of one or more computer readable medium(s), and said mediums may include any computer readable signal or any viable means of storing computer readable information. Computer readable storage medium(s) may include, but need not be limited to, any electronic, electromagnetic, magnetic, chemical, optical, mechanical, infrared, or semiconductor system, apparatus, or device, or any viable combination of the aforementioned storage mediums. A non-exhaustive list of computer readable storage medium(s) would therefore include the following: an electronic, electrical, or optical connection having one or more wires; a CD-ROM, any computer diskette, a hard disk, a ram disk, a RAM memory module, a ROM memory module, a magnetic storage device, an optical storage device, a mechanical storage device, or any viable combination of the above.

A computer readable storage medium may therefore be defined as any material or tangible medium that can contain, or store a logical sequence of instructions (a program) for use by, or in connection with an instruction execution system, apparatus or device. A computer readable signal medium may include any intangible or immaterial medium such as an electromagnetic propagated data signal (which may take many optical or electromagnetic forms or combinations thereof, such as baseband, radio waves or carrier waves) or any medium which is not a computer readable storage medium and which may be used to transport, propagate, communicate or execute any computer readable program code or logical instructions embedded or contained therein, using an instruction execution system, apparatus or device. Said apparatuses, systems and devices (or their components) may be implemented using programmable hardware devices or circuitry such as a large scale integrated circuits or gate arrays, logical semiconductor chips or transistors, programmable logical devices, or through software implementations using various processors, or combinations of the aforementioned.

The communication channels or networks as mentioned in this document or specification may be comprised of various types of electronic communication networks, including but not limited to, physical and logical LANs, WANs, and other point-to-point electronic, electromagnetic or electro-optical communication networks.

Whilst various steps and operations of the present subject matter have been described in a specific order with regards to the drawings, it should be noted that such descriptions does not necessarily require or imply that any such operations must be performed according to the particular sequence described, or that any desired outcome can only be achieved by performing all demonstrated or described operations in the manner and order shown. On the contrary, the execution sequences for the steps as depicted in the diagrams and specification may be altered or changed without departing from the spirit and scope of the invention. In addition, some steps or procedures may be omitted, or a multitude of steps may be merged into one step, or inversely, a step may be further slit or divided into a multitude of steps.

The present invention has been described in this document using a number of example embodiments and it should be clearly understood that the present invention is not limited to only of the disclosed embodiments. With many embodiments, and specifically with regards to the principle invention, namely the augmentation of equivocation, the present invention intends to cover various modifications and equivalent arrangements included in the spirit and scope of the appended claims. The scope of the claims is intended to meet the broadest explanations and covers all such modifications and equivalent structures and functions, which would allow for the equivocation principle or method to be implemented in a practical manner in a cryptographic or technological context as a means of increasing the conditional entropy or equivocation of a cryptosystem or plurality of cryptosystems, at a faster rate, than that which was lost through the encryption process.

The invention claimed is:

1. A method for the provision of a cryptosystem using equivocation augmentation in the encryption and decryption of data, the method comprising:
   generating a random message R1, comprised of a sequence of random numbers or characters, at a source node using an independent first entropy pool P1;
   generating a first key K1, a second key K2, a third key K3 and a fourth key K4 at the source node using a second entropy pool P2 initialised with an initial key KO shared between the source node and a destination node;
   encrypting a segment of a plaintext message M1 using an exclusive-OR (XOR) operation performed with the first key K1 to produce a first ciphertext C1;
   encrypting a segment of the random message R1 using an exclusive-OR (XOR) operation performed with the second key K2 to produce a second ciphertext C2;
   performing a message equivocation augmentation operation, wherein said operation increases the message equivocation ($H_E(M)$) associated with a third cyphertext C3 that is subject to a brute force attack by an assailant, said operation comprising both an exclusive-OR (XOR) encryption operation using the third key K3 and a transposition with fixed period encryption operation using the fourth key K4, by taking the first ciphertext C1 and second ciphertext C2 as inputs and producing the third ciphertext C3 as an output;
   transmitting of the third ciphertext C3 from the source node to the destination node;
   generating the first key K1, the second key K2, the third key K3 and the fourth key K4 at the destination node using a third entropy pool P3 initialised with the initial key KO shared between the source node and the destination node;
   decrypting the third ciphertext C3 at the destination node by a reversal of the encryption steps performed at the source node using said identical K1, K2, K3 and K4 keys to produce the segment of the plaintext message M1 and the segment of the random message R1; and
   performing a key equivocation augmentation operation, wherein said operation increases the key equivocation ($H_E(K)$) associated with the third cyphertext C3 that is subject to a brute force attack by an assailant, said operation including where the segment of the random stream R1 is used to alter the values in the second entropy pool P2 at the source node and is used to alter the values in the third entropy pool P3 at the destination node using a mathematical operation comprising at least one of modular addition or modular multiplication.

2. The method according to claim 1, wherein the step of performing a key equivocation augmentation operation by altering the values in random entropy pools using the random message sequence, further comprises using the random message sequence to determine or alter characteristics of the cryptosystem, including key lengths, key values, seed values, entropy pools, message bytes, random bytes, variables, encryption operations, and tables.

3. The method according to claim 2, further comprising where one or more encryption or decryption keys are used in a hierarchy of one or more nested encryption or nested decryption operations, or a combination of both, and said hierarchy having no limit as to the number of nested levels.

4. The method according to claim 1, wherein the step of performing a key equivocation augmentation operation comprises the application of the sequence of random stream R1 to the encryption or decryption keys, includes the application of said random sequence to one or more dynamic data structures, comprising one or more entropy pools, arrays, variables, tables, cyclic queues or random number generators, said data structures being capable of holding random values and allowing mathematical and logical operations to be performed on them, and said data structures being the recipient of key equivocation augmentation and being the source of some or all newly derived encryption or decryption keys, which may be derived in a predetermined or randomly determined manner.

5. The method according to claim 4, further comprising where the key equivocation augmentation operation is applied to a pseudo-random number generator, and where said pseudo-random number generator may be used as the source of the random message R1.

6. The method according to claim 1, further comprising embodiments where initial key(s), or encryption or decryption key(s) may be asymmetric or
   symmetric encryption/decryption or authentication keys.

7. A hardware device providing a cryptosystem using equivocation augmentation in the encryption and decryption of data, comprising, in combination:
   a memory module;
   a message input module;
   an entropy pool or a key synchronisation module;
   a communication module; and
   a processor programmed to:
   generate a random message R1, comprised of a sequence of random numbers or characters, at a source node using an independent first entropy pool P1;
   generate a first key K1, a second key K2, a third key K3 and a fourth key K4 at the source node using a second entropy pool P2 initialised with an initial key KO shared between the source node and a destination node;
   encrypt a segment of a plaintext message M1 using an exclusive-OR (XOR) operation performed with the first key K1 to produce a first ciphertext C1;

encrypt a segment of the random message R1 using an exclusive-OR (XOR) operation performed with the second key K2 to produce a second ciphertext C2;

perform a message equivocation augmentation operation, wherein said operation increases the message equivocation ($H_E(M)$) associated with a third cyphertext C3 that is subject to a brute force attack by an assailant, said operation comprising both an exclusive-OR (XOR) encryption operation using the third key K3 and a transposition with fixed period encryption operation using the fourth key K4, by taking the first ciphertext C1 and second ciphertext C2 as inputs and producing the third ciphertext C3 as an output; transmit the third ciphertext C3 from the source node to the destination node;

generate the first key K1, the second key K2, the third key K3 and the fourth key K4 at the destination node using a third entropy pool P3 initialised with the initial key K0 shared between the source node and the destination node;

decrypt the third ciphertext C3 at the destination node by a reversal of the encryption steps performed at the source node using said identical K1, K2, K3 and K4 keys to produce the segment of the plaintext message M1 and the segment of the random message R1; and perform a key equivocation augmentation operation, wherein said operation increases the key equivocation ($H_E(K)$) associated with the third cyphertext C3 that is subject to a brute force attack by an assailant, said operation including where the segment of the random stream R1 is used to alter the values in the second entropy pool P2 at the source node and is used to alter the values in the third entropy pool P3 at the destination node using a mathematical operation comprising at least one of modular addition or modular multiplication.

* * * * *